US012704719B2

(12) United States Patent
Takagi

(10) Patent No.: US 12,704,719 B2
(45) Date of Patent: Aug. 11, 2026

(54) OCULAR OPTICAL SYSTEM INCLUDING FRESNEL LENS SURFACES FORMED ON LENS SURFACES FACING AN OBSERVATION OBJECT AND HEAD-MOUNTED DISPLAY

(71) Applicant: NIKON CORPORATION, Tokyo (JP)

(72) Inventor: Hidetsugu Takagi, Yokohama (JP)

(73) Assignee: NIKON CORPORATION, Tokyo (JP)

( * ) Notice: Subject to any disclaimer, the term of this patent is extended or adjusted under 35 U.S.C. 154(b) by 994 days.

(21) Appl. No.: 16/970,577

(22) PCT Filed: Jan. 28, 2019

(86) PCT No.: PCT/JP2019/002619

§ 371 (c)(1),
(2) Date: Jan. 8, 2021

(87) PCT Pub. No.: WO2019/163415

PCT Pub. Date: Aug. 29, 2019

(65) Prior Publication Data

US 2021/0199967 A1 Jul. 1, 2021

(30) Foreign Application Priority Data

Feb. 22, 2018 (JP) ................................ 2018-029482

(51) Int. Cl.
*G02B 27/01* (2006.01)
*G02B 3/08* (2006.01)

(52) U.S. Cl.
CPC ........... *G02B 27/0172* (2013.01); *G02B 3/08* (2013.01); *G02B 2027/013* (2013.01); *G02B 2027/0178* (2013.01)

(58) Field of Classification Search
CPC .............. G02B 27/017; G02B 27/0172; G02B 2027/0178; G02B 3/08
See application file for complete search history.

(56) References Cited

U.S. PATENT DOCUMENTS 5,446,588 A * 8/1995 Missig ............... G02B 27/4216 359/566
10,215,890 B2 * 2/2019 Perreault ................ G02B 13/18
(Continued)

FOREIGN PATENT DOCUMENTS

JP 2015-49305 A 3/2015
JP 2017-211474 A 11/2017
(Continued)

OTHER PUBLICATIONS

Office Action dated Aug. 3, 2023, in European Patent Application No. 19 757 696.0.
(Continued)

*Primary Examiner* — Bao-Luan Q Le

(57) ABSTRACT

An ocular optical system (EL) comprises: a first Fresnel lens (first lens (L1)) having a first Fresnel surface (FSa) formed on the lens surface on the image display unit (11) side; and a second Fresnel lens (second lens (L2)) placed closer to the image display unit (11) than the first Fresnel lens and having a second Fresnel surface (FSb) formed on the lens surface on the image display unit (11) side. In a plurality of wall surfaces constituting the first Fresnel surface (FSa) and the second Fresnel surface (FSb) within the radii of at least 10 mm from the optical axes for the first Fresnel surface (FSa) and the second Fresnel surface (FSb), the tilt angle of a wall surface in the first Fresnel surface (FSa) relative to the optical axis for the wall surface is greater than the tilt angle of a wall surface in the second Fresnel surface (FSb) relative to the optical axis for the wall surface, for the wall surfaces that are in the same order from the optical axes for the first and the second Fresnel surfaces.

18 Claims, 21 Drawing Sheets

(56) References Cited

U.S. PATENT DOCUMENTS

| | | | | |
|---|---|---|---|---|
| 10,371,952 | B2 * | 8/2019 | Wheelwright | G02B 27/0176 |
| 10,379,359 | B2 * | 8/2019 | Wheelwright | G02B 27/0172 |
| 10,379,360 | B2 * | 8/2019 | Wheelwright | G02B 3/08 |
| 10,459,215 | B2 * | 10/2019 | Iba | G02B 27/4216 |
| 10,761,321 | B2 * | 9/2020 | Fortin-Deschênes | G02B 25/008 |
| 10,890,694 | B2 * | 1/2021 | Hudman | G02B 3/08 |
| 11,054,646 | B1 * | 7/2021 | Chan | G02B 27/0172 |
| 11,067,724 | B2 * | 7/2021 | Perreault | G02B 26/0875 |
| 11,237,304 | B2 * | 2/2022 | Huang | G02B 3/08 |
| 11,454,747 | B1 * | 9/2022 | Wheelwright | G02B 3/10 |
| 2007/0153402 | A1 * | 7/2007 | Destain | G03B 21/208 359/742 |
| 2016/0011341 | A1 | 1/2016 | Smith | |
| 2016/0178912 | A1 | 6/2016 | Kusuda et al. | |
| 2017/0336539 | A1 * | 11/2017 | Perreault | G02B 3/04 |
| 2018/0074320 | A1 * | 3/2018 | Wheelwright | G02B 3/08 |
| 2018/0074323 | A1 * | 3/2018 | Wheelwright | G02B 3/08 |
| 2018/0074324 | A1 * | 3/2018 | Wheelwright | G02C 7/02 |
| 2018/0074325 | A1 * | 3/2018 | Wheelwright | G02B 27/0176 |
| 2018/0136460 | A1 * | 5/2018 | Bierhuizen | G02B 27/0025 |
| 2018/0307036 | A1 * | 10/2018 | Iba | G02B 3/04 |
| 2019/0072763 | A1 | 3/2019 | Matsumoto et al. | |
| 2019/0227305 | A1 * | 7/2019 | Fortin-Deschênes | G02B 3/08 |

FOREIGN PATENT DOCUMENTS

| | | | |
|---|---|---|---|
| JP | 2017-211475 | A | 11/2017 |
| WO | WO 2017/161437 | A1 | 9/2017 |
| WO | WO 2018/008249 | A1 | 1/2018 |

OTHER PUBLICATIONS

International Search Report dated Apr. 16, 2019, in corresponding International Application No. PCT/JP2019/002619 (3 pages).

Written Opinion of the International Searching Authority dated Apr. 16, 2019, in corresponding International Application No. PCT/JP2019/002619 (4 pages).

Chinese Office Action issued Sep. 13, 2021, in counterpart Chinese Patent Application No. 201980014334.5.

Office Action issued Nov. 16, 2021, in Taiwan Patent Application No. 108103465.

Notice of Reasons for Refusal dated Mar. 23, 2021, in corresponding Japanese PatentApplication No. 2020-501613.

Extended European Search Report issued Oct. 28, 2021, in counterpart European Patent Application No. 19757696.0.

Written Opinion of the International Searching Authority, PCT/ISA/237, dated Apr. 16, 2019 in corresponding International Application No. PCT/JP2019/002619.

Office Action issued on May 14, 2025 from the European Patent Office in the counterpart European Patent Application No. 19757696.0.

* cited by examiner

SPHERICAL ABERRATION
g F e d C
1.00
0.75
0.50
0.25
-5.00
-2.50
0.0
2.50
5.00
FOCUS (MILLIMETERS)
ASTIGMATISM
ANGLE (deg)
g F e d C
45.00
30.00
15.00
-5.0
-2.5
0.0
2.5
5.0
FOCUS (MILLIMETERS)
DISTORTION
ANGLE (deg)
60.00
45.00
30.00
15.00
-50
-25
0
25
50
% DISTORTION SPHERICAL ABERRATION
g F e d C
1.00
0.75
0.50
0.25
-5.00
-2.50
0.0
2.50
5.00
FOCUS (MILLIMETERS)
ASTIGMATISM
ANGLE (deg)
g F e d C
41.25
27.50
13.75
-5.0
-2.5
0.0
2.5
5.0
FOCUS (MILLIMETERS)
DISTORTION
ANGLE (deg)
55.00
41.25
27.50
13.75
-50
-25
0
25
50
% DISTORTION Y-FAN
X-FAN
RFH=1.00
RFH=0.83
RFH=0.70
RFH=0.59
RFH=0.40
RFH=0.29
RFH=0.19
RFH=0.12
RFH=0.06
RFH=0.00
C d e F g
0.5
-0.5

SPHERICAL ABERRATION gFedC 1.00
0.75
0.50
0.25
-5.00 -2.50 0.0 2.50 5.00
FOCUS (MILLIMETERS)

ASTIGMATISM

ANGLE (deg)
gFedC
55.00
41.25
27.50
13.75
-5.0 -2.5 0.0 2.5 5.0
FOCUS (MILLIMETERS)

DISTORTION

ANGLE (deg)
55.00
41.25
27.50
13.75
-50 -25 0 25 50
% DISTORTION

OCULAR OPTICAL SYSTEM INCLUDING FRESNEL LENS SURFACES FORMED ON LENS SURFACES FACING AN OBSERVATION OBJECT AND HEAD-MOUNTED DISPLAY

TECHNICAL FIELD

The present invention relates to an ocular optical system and a head-mounted display.

TECHNICAL BACKGROUND

For example, Patent literature 1 discloses a head-mounted display that includes ocular optical systems. Preferably, such ocular optical systems have low profile in view of reduction in weight.

PRIOR ARTS LIST

Patent Document

Patent literature 1: Japanese Laid-Open Patent Publication No. 2015-49305 (A)

SUMMARY OF THE INVENTION

An ocular optical system according to a first aspect comprises: a first Fresnel lens that includes a first Fresnel surface formed on a lens surface facing an observation object; and a second Fresnel lens that is disposed closer to the observation object than the first Fresnel lens, and includes a second Fresnel surface formed on a lens surface facing the observation object, wherein at least in a range of a radius of 10 mm from an optical axis on each of the first Fresnel surface and the second Fresnel surface, at a plurality of wall surfaces constituting the first Fresnel surface and at a plurality of wall surfaces constituting the second Fresnel surface, inclined angles of the wall surfaces of the first Fresnel surface from the optical axis are larger than inclined angles of the respective wall surfaces on the second Fresnel surface in identical location counted from the optical axis.

A head-mounted display according to a second aspect comprises: an image display capable of displaying an image; and an ocular optical system for observing the image displayed on the image display, wherein the ocular optical system is the ocular optical system described above.

DESCRIPTION OF THE EMBODIMENTS

Figure 1:
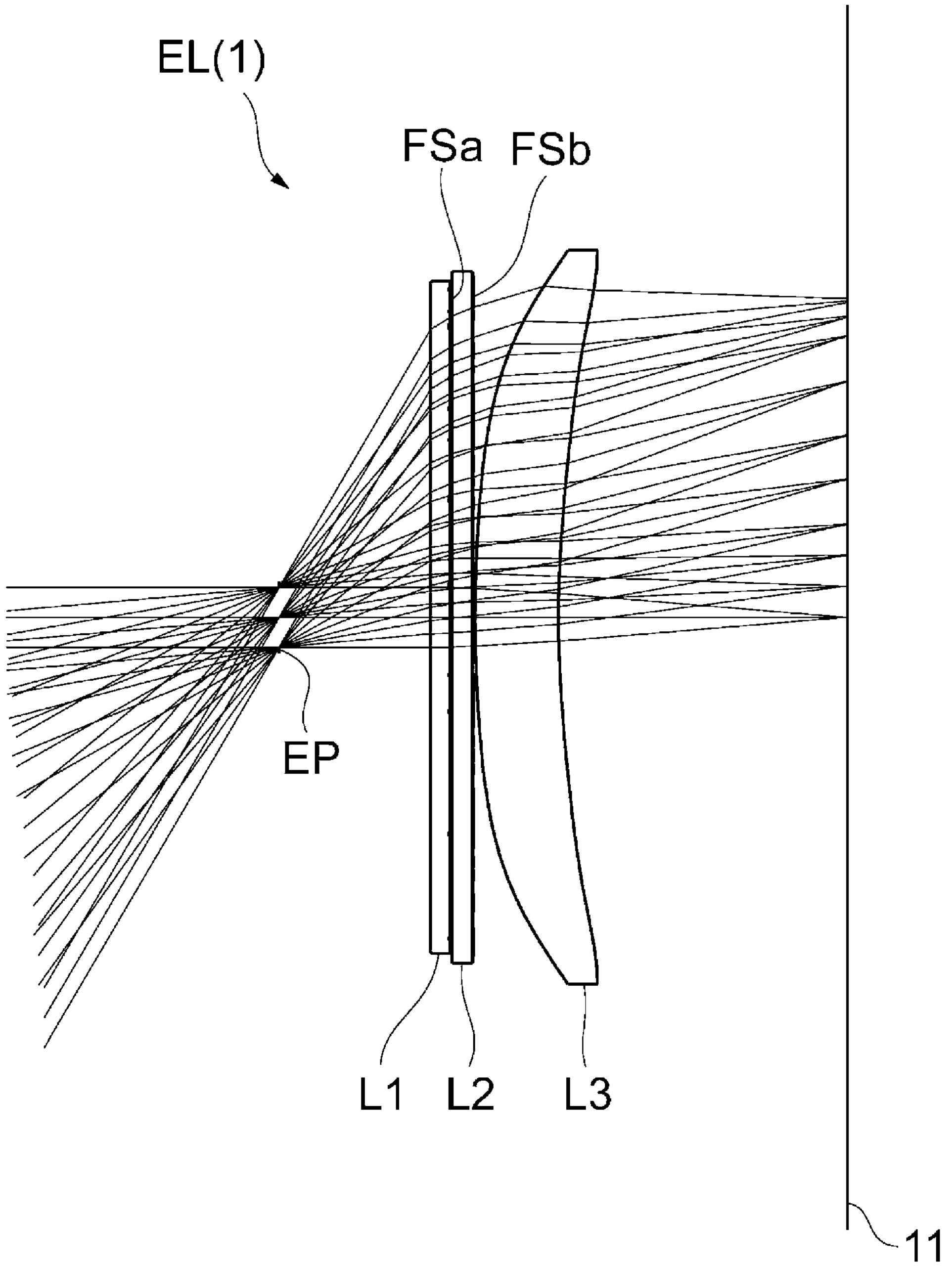
FIG. 1 is a lens configuration diagram of an ocular optical system according to a first example.

Hereinafter, an ocular optical system and a head-mounted display according to this embodiment is described with reference to the drawings. As shown in FIG. 1, an ocular optical system EL(1) as an example of an ocular optical system EL according to this embodiment comprises: a first Fresnel lens (first lens L1) that includes a first Fresnel surface FSa formed on a lens surface facing an observation object; and a second Fresnel lens (second lens L2) that is disposed closer to the observation object than the first Fresnel lens, and includes a second Fresnel surface FSb formed on a lens surface facing the observation object. At least in a range of a radius of 10 mm from an optical axis on each of the first Fresnel surface FSa and the second Fresnel surface FSb, at a plurality of wall surfaces constituting the first Fresnel surface FSa and at a plurality of wall surfaces constituting the second Fresnel surface FSb, inclined angles of the wall surfaces of the first Fresnel surface FSa from the optical axis are larger than inclined angles of the respective wall surfaces on the second Fresnel surface FSb in identical descending orders of proximity to the optical axis. Accordingly, it is possible to provide an ocular optical system that has a large angle of view, and favorably corrected various aberrations, such as astigmatism, while achieving a low profile. Furthermore, the refraction and reflection of rays on the wall surfaces of each Fresnel surface can be reduced. In the entire range (effective diameter) of each of the first Fresnel surface FSa and the second Fresnel surface FSb, the inclined angles of the wall surfaces of the first Fresnel surface FSa from the optical axis may be larger than the respective inclined angles of the wall surfaces of the second Fresnel surface FSb from the optical axis in the identical descending orders of proximity to the optical axis. At least in the range of the radius of 10 mm from the optical axis, the inclined angles of all of the wall surfaces of the first Fresnel surface FSa from the optical axis may be larger than the inclined angle of any of the wall surfaces of the second Fresnel surface FSb from the optical axis.

The ocular optical system EL according to this embodiment can be used to observe an image displayed on an image display 11 as an observation object, for example. The ocular optical system EL according to this embodiment may be the ocular optical system EL(2) shown in FIG. 5, the ocular optical system EL(3) shown in FIG. 8, the ocular optical system EL(4) shown in FIG. 11, the ocular optical system EL(5) shown in FIG. 14, and the ocular optical system EL(6) shown in FIG. 17.

Figure 20A:
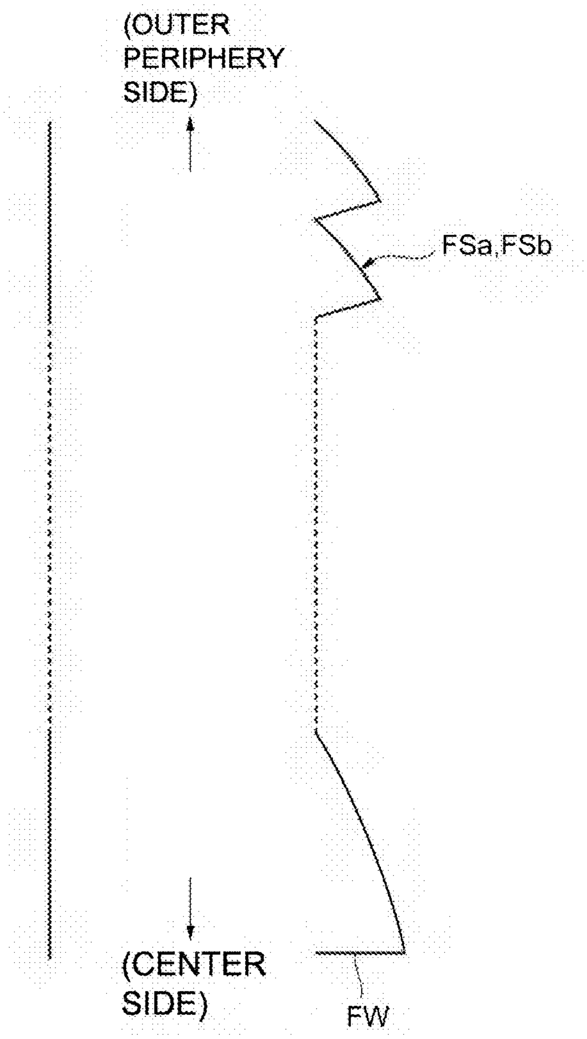
FIG. 20A is a schematic diagram showing an example of a Fresnel surface.
Figure 20B:
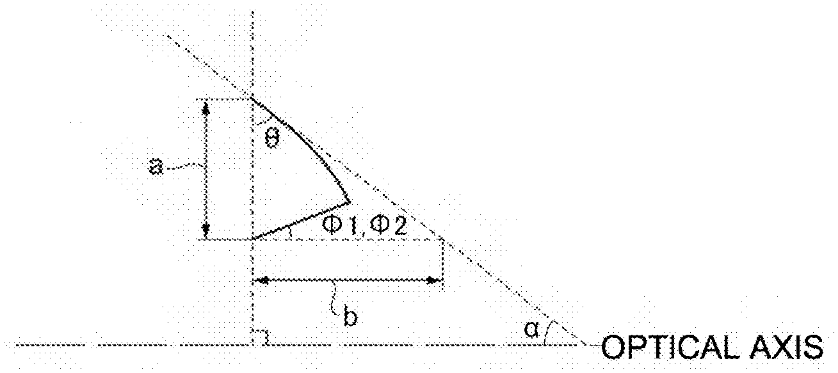
FIG. 20B is a schematic diagram for illustrating the aspect ratio and the inclined angle of the Fresnel surface.

Each of the Fresnel surfaces FSa and FSb according to this embodiment are a surface that changes the traveling direction of light by refracting the light. For example, as shown in FIG. 20A, each of the Fresnel surfaces FSa and FSb is formed to have ring bands having a saw-tooth shape in a sectional view. The pitches of Fresnel steps of each of the Fresnel surfaces FSa and FSb vary according to the position in the radial direction of the Fresnel lens. Among the wall surfaces FW of each of the Fresnel surfaces FSa and FSb, some wall surfaces are inclined from the optical axis. The inclined angles of the wall surfaces FW of each of the Fresnel surfaces FSa and FSb from the optical axis vary according to the position in the radial direction of the Fresnel lens. Here, as shown in FIG. 20B, the angle between the tangent of the Fresnel surface and the optical axis is assumed as $\alpha$, and the angle represented as $\theta=90°-\alpha$ is assumed as a tangent angle $\theta$. In this Description, based on the tangent angle $\theta$, the ratio represented by $|b/a|=|\tan\theta|$ is defined as the aspect ratio of Fresnel steps of each Fresnel surface. The inclined angles of wall surfaces of the Fresnel surfaces from the optical axis are respectively assumed as Φ1 and Φ2. The maximum values of inclined angles in predetermined ranges on the first Fresnel surface FSa and the second Fresnel surface FSb (for example, in the range of the radius of 10 mm from the optical axis, or in the entire range (effective diameter)) are respectively assumed as Φ1mx and Φ2mx. The average values of the inclined angles are respectively assumed as Φ1av and Φ2av. Note that the Fresnel surface may be formed to have a spherical shape or an aspherical shape, or a linear shape in a sectional view.

Preferably, in the ocular optical system EL according to this embodiment, at least in the range of the radius of 10 mm from the optical axis on each of the first Fresnel surface FSa and the second Fresnel surface FSb, a following conditional expression (1) is satisfied, $$2.5 \le \Phi1mx/\Phi2mx \qquad (1)$$

where Φ1mx: a maximum value of the inclined angles of the wall surfaces of the first Fresnel surface FSa from the optical axis, and Φ2mx: a maximum value of the inclined angles of the wall surfaces of the second Fresnel surface FSb from the optical axis.

The conditional expression (1) is a conditional expression that defines an appropriate range for the ratio between the maximum value of the inclined angles of the wall surfaces of the first Fresnel surface FSa from the optical axis, and the maximum value of the inclined angles of the wall surfaces of the second Fresnel surface FSb. Satisfying the conditional expression (1), the inclined angles of the wall surfaces of the first Fresnel surface FSa become relatively large. Accordingly, rays passing through the first Fresnel surface FSa can be prevented from passing through the wall surfaces of the first Fresnel surface FSa, and the flares can be reduced.

If the corresponding value of the conditional expression (1) falls below the lower limit value, the inclined angles of the wall surfaces of the first Fresnel surface FSa become relatively small. Accordingly, it becomes difficult to reduce the flares. To ensure that the advantageous effects of this embodiment can be produced, it is preferable that the lower limit value of the conditional expression (1) be 3.8. Preferably, the upper limit value of the conditional expression (1) may be 20.0 or less. In the entire range (effective diameter) of each of the first Fresnel surface FSa and the second Fresnel surface FSb, the conditional expression (1) may be satisfied.

Preferably, in the ocular optical system EL according to this embodiment, at least in the range of the radius of 10 mm from the optical axis on each of the first Fresnel surface FSa and the second Fresnel surface FSb, a following conditional expression (2) is satisfied, $$2.5 \le \Phi1av/\Phi2av \qquad (2)$$

where Φ1av: an average value of the inclined angles of the wall surfaces of the first Fresnel surface FSa from the optical axis, and Φ2av: an average value of the inclined angles of the wall surfaces of the second Fresnel surface FSb from the optical axis.

The conditional expression (2) is a conditional expression that defines an appropriate range for the ratio between the average value of the inclined angles of the wall surfaces of the first Fresnel surface FSa from the optical axis, and the average value of the inclined angles of the wall surfaces of the second Fresnel surface FSb. Satisfying the conditional expression (2), the inclined angles of the wall surfaces of the first Fresnel surface FSa become relatively large. Accordingly, rays passing through the first Fresnel surface FSa can be prevented from passing through the wall surfaces of the first Fresnel surface FSa, and the flares can be reduced.

If the corresponding value of the conditional expression (2) falls below the lower limit value, the inclined angles of the wall surfaces of the first Fresnel surface FSa become relatively small. Accordingly, it becomes difficult to reduce the flares. To ensure that the advantageous effects of this embodiment can be produced, it is preferable that the lower limit value of the conditional expression (2) be 3.8. Preferably, the upper limit value of the conditional expression (2) may be 15.0 or less. In the entire range (effective diameter) of each of the first Fresnel surface FSa and the second Fresnel surface FSb, the conditional expression (2) may be satisfied.

Preferably, in the ocular optical system EL according to this embodiment, a following conditional expression (3) is satisfied, $$0.3 \le fR1/fR2 \le 1.5 \qquad (3)$$

where fR1: a focal length of the first Fresnel lens, and fR2: a focal length of the second Fresnel lens.

The conditional expression (3) is a conditional expression that defines an appropriate range for the ratio between the focal lengths of the first Fresnel lens and the second Fresnel lens. Satisfying the conditional expression (3), the first Fresnel lens disposed closer to the eye point EP is allowed to have a high power (refractive power). Accordingly, the various aberrations, such as astigmatism and coma aberration, can be favorably corrected.

If the corresponding value of the conditional expression (3) falls below the lower limit value, the power of the first Fresnel lens becomes relatively too high. Accordingly, it becomes difficult to correct the astigmatism, coma aberration and the like. To ensure that the advantageous effects of this embodiment can be produced, it is preferable that the lower limit value of the conditional expression (3) be 0.4. If the corresponding value of the conditional expression (3) exceeds the upper limit value, the power of the first Fresnel lens becomes relatively low. Accordingly, it becomes difficult to correct the astigmatism, coma aberration and the like. To ensure that the advantageous effects of this embodiment can be produced, it is preferable that the upper limit value of the conditional expression (3) be 1.2.

Preferably, in the ocular optical system EL according to this embodiment, a following conditional expression (4) is satisfied, $$0 < AS1 \leq 1.4 \tag{4}$$

where AS1: a maximum value of aspect ratios of Fresnel steps of the first Fresnel surface FSa.

The conditional expression (4) is a conditional expression that defines an appropriate range for the maximum value of the aspect ratios of the Fresnel steps of the first Fresnel surface FSa. If the corresponding value of the conditional expression (4) exceeds the upper limit value, the maximum value of the aspect ratios of the Fresnel steps of the first Fresnel surface FSa becomes too high. Accordingly, it becomes difficult to manufacture the ocular optical system EL that includes the first Fresnel lens. To ensure that the advantageous effects of this embodiment can be produced, it is preferable that the upper limit value of the conditional expression (4) be 1.1.

Preferably, in the ocular optical system EL according to this embodiment, a following conditional expression (5) is satisfied, $$0 < AS2 \leq 1.7 \tag{5}$$

where AS2: a maximum value of aspect ratios of Fresnel steps of the second Fresnel surface FSb.

The conditional expression (5) is a conditional expression that defines an appropriate range for the maximum value of the aspect ratios of the Fresnel steps of the second Fresnel surface FSb. If the corresponding value of the conditional expression (5) exceeds the upper limit value, the maximum value of the aspect ratios of the Fresnel steps of the second Fresnel surface FSb becomes too high. Accordingly, it becomes difficult to manufacture the ocular optical system EL that includes the second Fresnel lens. To ensure that the advantageous effects of this embodiment can be produced, it is preferable that the upper limit value of the conditional expression (5) be 1.4.

Preferably, in the ocular optical system EL according to this embodiment, a following conditional expression (6) is satisfied, $$2.0 \leq (2 \times \omega)/TL \tag{6}$$

where ω: an angle of view of the ocular optical system EL, and

TL: a total length of the ocular optical system EL.

The conditional expression (6) is a conditional expression that defines for an appropriate range for the ratio between the angle of view and the total length of the ocular optical system EL. Satisfying the conditional expression (6), the ocular optical system EL that has a short total length and a wide angle of view can be achieved. If the corresponding value of the conditional expression (6) falls below the lower limit value, it becomes difficult to increase the angle of view while reducing the total length of the ocular optical system EL. To ensure that the advantageous effects of this embodiment can be produced, it is preferable that the lower limit value of the conditional expression (6) be 3.0 [Deg/mm]. Preferably, the upper limit value of the conditional expression (6) may be 4.5 [Deg/mm] or less.

Preferably, in the ocular optical system EL according to this embodiment, a following conditional expression (7) is satisfied.

$$0 < X1/TL \leq 0.80 \tag{7}$$

where X1: a length from a lens surface of the first Fresnel lens facing an eye point EP to the observation object, and TL: a total length of the ocular optical system EL.

The conditional expression (7) is a conditional expression that defines an appropriate range for the ratio between the distance from the lens surface of the first Fresnel lens facing the eye point EP and the observation object, and the total length of the ocular optical system EL. Satisfying the conditional expression (7), the ocular optical system EL that has a short total length and a wide angle of view can be achieved. If the corresponding value of the conditional expression (7) exceeds the upper limit value, it becomes difficult to reduce the total length of the ocular optical system EL and secure an eye relief. To ensure that the advantageous effects of this embodiment can be produced, it is preferable that the upper limit value of the conditional expression (7) be 0.75.

Preferably, in the ocular optical system EL according to this embodiment, a thickness of the first Fresnel lens on the optical axis is equal to or less than a thickness of the second Fresnel lens on the optical axis. This allows the thickness of the first Fresnel lens on the optical axis to be relatively small, which allows the first Fresnel surface FSa to approach the eye point EP, and can favorably correct the various aberrations, such as astigmatism and coma aberration.

Preferably, in the ocular optical system EL according to this embodiment, a following conditional expression (8) is satisfied, $$0 < 1 - (SG1/TH1) \leq 0.97 \tag{8}$$

where SG1: an average value of amounts of sag of the first Fresnel surface FSa, and TH1: a thickness of the first Fresnel lens on the optical axis.

The conditional expression (8) is a conditional expression that defines an appropriate range for the ratio between the average value of the amounts of sag of the first Fresnel surface FSa and the thickness of the first Fresnel lens on the optical axis. Satisfying the conditional expression (8), the amount of sag of the first Fresnel surface FSa becomes large, which can reduce the number of ring bands on the first Fresnel surface FSa. Accordingly, the flares caused by the discontinuous parts, wall surfaces, distal ends and the like of the first Fresnel surface FSa can be reduced. If the corresponding value of the conditional expression (8) exceeds the upper limit value, the amount of sag of the first Fresnel surface FSa becomes small. Accordingly, it becomes difficult to reduce the flares. To ensure that the advantageous effects of this embodiment can be produced, it is preferable that the upper limit value of the conditional expression (8) be 0.95.

Preferably, in the ocular optical system EL according to this embodiment, a following conditional expression (9) is satisfied, $$0 < 1 - (SG2/TH2) \leq 0.97 \quad (9)$$

where SG2: an average value of amounts of sag of the second Fresnel surface FSb, and TH2: a thickness of the second Fresnel lens on the optical axis.

The conditional expression (9) is a conditional expression that defines an appropriate range for the ratio between the average value of the amounts of sag of the second Fresnel surface FSb and the thickness of the second Fresnel lens on the optical axis. Satisfying the conditional expression (9), the amount of sag of the second Fresnel surface FSb becomes large, which can reduce the number of ring bands on the second Fresnel surface FSb. Accordingly, the flares caused by the discontinuous parts, wall surfaces, distal ends and the like of the second Fresnel surface FSb can be reduced. If the corresponding value of the conditional expression (9) exceeds the upper limit value, the amount of sag of the second Fresnel surface FSb becomes small. Accordingly, it becomes difficult to reduce the flares. To ensure that the advantageous effects of this embodiment can be produced, it is preferable that the upper limit value of the conditional expression (9) be 0.95.

Preferably, in the ocular optical system EL according to this embodiment, the first Fresnel lens and the second Fresnel lens have positive refractive powers. Accordingly, it is possible to increase the angle of view of the ocular optical system EL and reduce the total length, while favorably correcting the aberrations.

Preferably, in the ocular optical system EL according to this embodiment, a lens surface of the first Fresnel lens facing an eye point EP is a flat surface, and a lens surface of the second Fresnel lens facing the eye point EP is a flat surface or an aspherical surface. Accordingly, it is possible to increase the angle of view of the ocular optical system EL and reduce the total length, while favorably correcting the aberrations.

Preferably, the ocular optical system EL according to this embodiment comprises: the first Fresnel lens; the second Fresnel lens; and an aspherical lens having an aspherical surface, wherein the aspherical lens is disposed closer to an image than the second Fresnel lens, or between the first Fresnel lens and the second Fresnel lens. Accordingly, it is possible to increase the angle of view of the ocular optical system EL and reduce the total length, while favorably correcting the aberrations.

Figure 21:
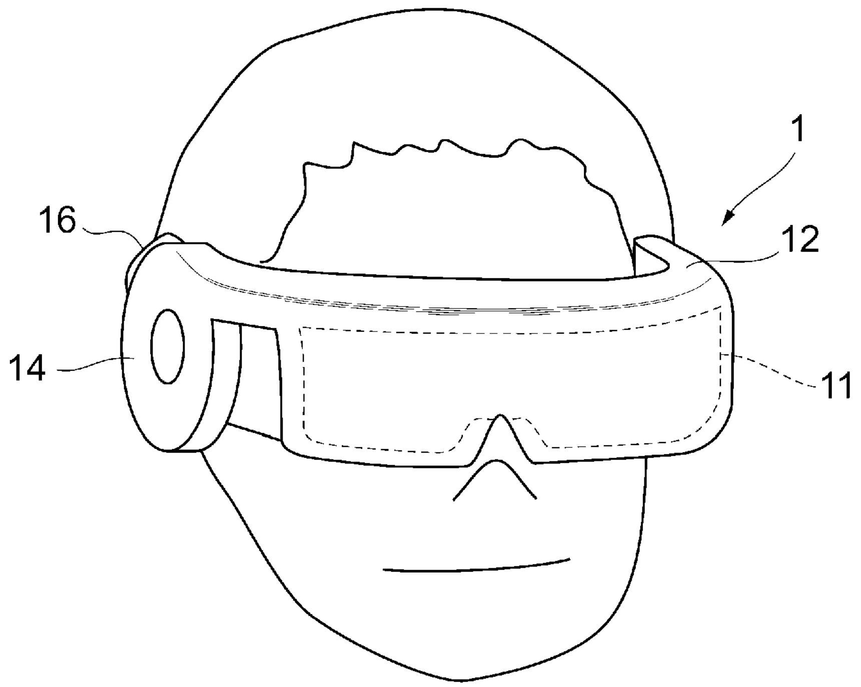
FIG. 21 is an external view of a head-mounted display.

A head-mounted display according to this embodiment comprises the ocular optical system having the configuration described above. As a specific example thereof, a head-mounted display that includes the aforementioned ocular optical system EL is described with reference to FIG. 21. The head-mounted display 1 shown in FIG. 21 is used in a state of being fixed at the head of the user. The head-mounted display 1 includes the image display 11, the ocular optical system EL (not shown in FIG. 21), and a housing 12 that stores them. Speakers 14 for providing the user with audio information are arranged on left and right sides of the housing 12. A band 16 for fixing the housing 12 onto the head of the user is attached to a rear part of the housing 12.

The image display 11 and the ocular optical system EL are configured to be arranged to face the eyes of the user in a state where the housing 12 is fixed on the head of the user. Although not shown in detail, the image display 11 is configured to include a liquid crystal display element or the like, for example. Two sets of ocular optical systems EL are provided in conformity with both the eyes of the user. In such a head-mounted display 1, when the image display 11 displays predetermined images, light from the image display 11 passes through the ocular optical systems EL and reaches the eyes of the user. This allows the user to view the images displayed on the image display 11, through the ocular optical systems EL. According to the above description, by mounting the ocular optical systems EL, a head-mounted display can be obtained that has a wide angle of view and favorably corrected various aberrations, such as astigmatism, while achieving a low profile.

The images displayed on the image display 11 may be still images or moving images. The image display 11 may respectively display a parallax image for the right eye, and a parallax image for the left eye, and the user may use the parallax images through the ocular optical systems EL, thereby allowing the images to be recognized as a stereoscopic image. The image display 11 is not limited to what has a configuration of being provided integrally with the housing 12. For example, a configuration may be adopted where a mobile terminal or the like that is provided separately from the housing and can display an image is attached to the housing and used as the image display.

EXAMPLES

Each example of the present application is hereinafter described with reference to the accompanying drawings. FIGS. 1, 5, 8, 11, 14 and 17 show the lens configurations and refractive power allocations of ocular optical systems EL {EL(1) to EL(6)} according to first to sixth examples.

In these FIGS. 1, 5, 8, 11, 14 and 17, each lens is represented by a combination of a symbol L and a numeral (or an alphabetical letter). In this case, to prevent the types and numbers of symbols and numerals from increasing and causing complication, lens groups and the like are represented using combinations of symbols and numerals independently on an example-by-example basis. Accordingly, even though the combinations of the same symbols and numerals are used among the examples, the combinations do not mean the same configuration.

Tables 1 to 6 are hereinafter shown. Among the tables, Table 1 is a table showing data in a first example, Table 2 is that in a second example, Table 3 is that in a third example, Table 4 is that in a fourth example, Table 5 is that in a fifth example, and Table 6 is that in a sixth example. In each example, d-line (wavelength λ=587.6 nm), e-line (wavelength λ=546.1 nm), g-line (wavelength λ=435.8 nm), C-line (wavelength λ=656.3 nm), and F-line (wavelength λ=486.1 nm) are selected as calculation targets of aberration characteristics.

In [Data] of each table, f denotes the focal length of the ocular optical system, fR1 denotes the focal length of the first Fresnel lens, fR2 denotes the focal length of the second Fresnel lens, and fAS denotes the focal length of the aspherical lens respectively. In [Data], ω denotes the angle of view (units of "°"), ER denotes the eye relief, X1 denotes the distance from the lens surface of the first Fresnel lens facing the eye point to the image display (observation object), and TL denotes the total length of the ocular optical system (the distance from the eye point to the image display (observation object)) respectively. In [Lens data], the surface number denotes the number of each lens surface in a descending order of proximity to the eye point, R denotes the radius of curvature of each lens surface, D denotes the interval of each lens surface, nd denotes the refractive index for the d-line (wavelength λ=587.6 nm), and νd denotes the Abbe number for the d-line (wavelength λ=587.6 nm) respectively. Note that *a added to the right of the first column (surface number) denotes that the lens surface is an aspherical surface. Note that *b added to the right of the first column (surface number) denotes that the lens surface is an aspherical-shaped Fresnel surface. The radius of curvature of "∞" denotes a flat surface or an opening. Description of the refractive index of air nd=1.0000 is omitted.

It is assumed that when the height in a direction perpendicular to the optical axis (ring band position) is y, the amount of sag in the optical axis direction is X(y), the radius of curvature of a reference spherical surface (paraxial radius of curvature) is r, the conical coefficient is k, and the n-th-order (n=2, 4, 6, 8, 10, 12, 14, 16, 18, and 20) aspherical coefficient is An, the aspherical coefficient indicated in [Aspherical surface data] is represented by the following expression (A). Note that the second-order aspherical coefficient A2 is 0, and description thereof is omitted. "E-n" denotes "$\times 10^{-n}$". For example, "1.234E-05" denotes "$1.234\times 10^{-5}$".

$$X(y) = (y^2/r)/\{1+(1-(1+\kappa)xy^2/r^2)^{1/2}\} + A4xy^4 + A6xy^6 + A8xy^8 + A10xy^{10} + A12xy^{12} + A14xy^{14} + A16xy^{16} + A18xy^{18} + A20xy^{20} \quad \text{(A)}$$

In [Fresnel surface data], Φ1mx denotes the maximum value of inclined angles of the wall surfaces of the first Fresnel surface from the optical axis, Φ2mx denotes the maximum value of inclined angles of the wall surfaces of the second Fresnel surface from the optical axis, Φ1av denotes the average value of inclined angles of the wall surfaces of the first Fresnel surface from the optical axis, and Φ2av denotes the average value of inclined angles of the wall surfaces of the second Fresnel surface from the optical axis. In [Fresnel surface data], AS1 denotes the maximum value of the aspect ratios of the Fresnel steps of the first Fresnel surface, AS2 denotes the maximum value of the aspect ratios of the Fresnel steps of the second Fresnel surface, SG1 denotes the average value of the amounts of sag of the first Fresnel surface, and SG2 denotes the average value of the amounts of sag of the second Fresnel surface respectively. Note that [Fresnel surface data] shows the values in the range of the radius of 10 mm from the optical axis on the first Fresnel surface FSa and the second Fresnel surface FSb, and the values in the entire range (effective diameter) of each of the first Fresnel surface FSa and the second Fresnel surface FSb respectively. [Conditional expression corresponding value] shows corresponding values of the conditional expressions.

Note that "mm" is typically used for the units of the focal length f, the radius of curvature R and other lengths listed in all the following data values. However, the optical system can achieve equivalent optical performance even with proportional increase or proportional reduction in size. Accordingly, the units are not limited thereto. The description of the table so far is common to all the examples. Redundant description is hereinafter omitted.

First Example

First, a first example of the present application is described with reference to FIGS. 1 to 4 and Table 1. The ocular optical system in each example is used as an ocular optical system for observing the image displayed on the image display 11. FIG. 1 is a lens configuration diagram of an ocular optical system EL(1) according to the first example. The ocular optical system EL(1) according to the first example includes, in an order sequentially from the eye point EP: a plano-convex first lens L1 having a positive refractive power; a plano-convex second lens L2 having a positive refractive power; and a meniscus third lens L3 having a negative refractive power.

Figure 4:
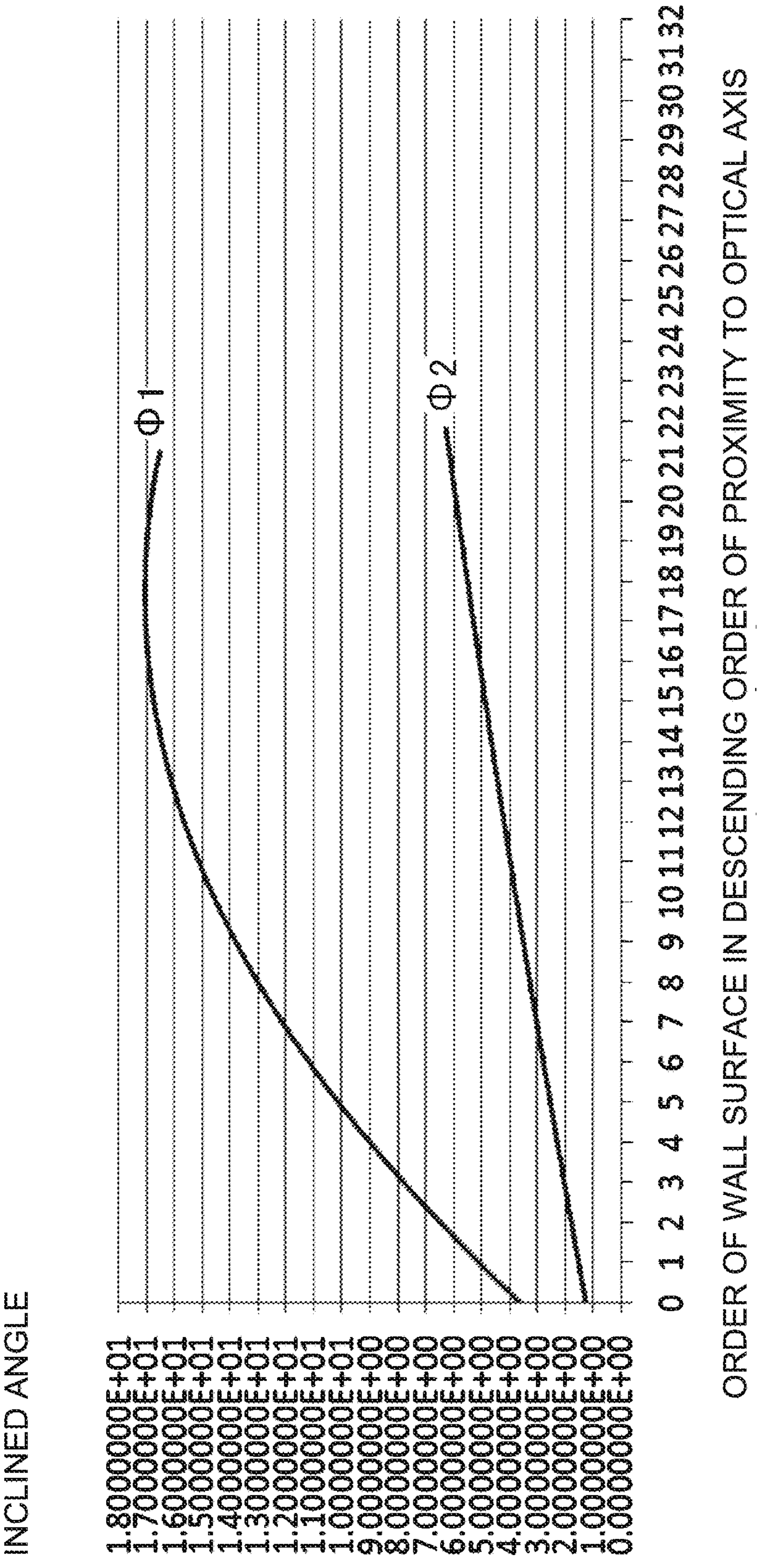
FIG. 4 is a graph showing the inclined angle of a Fresnel surface of the ocular optical system according to the first example.

The first lens L1 is a first Fresnel lens including an aspherical-shaped first Fresnel surface FSa formed on a lens surface facing the image display 11 (observation object). The second lens L2 is a second Fresnel lens including an aspherical-shaped second Fresnel surface FSb formed on a lens surface facing the image display 11. FIG. 4 is a graph schematically indicating variation in the inclined angle Φ1 of the wall surface of the first Fresnel surface FSa (from the optical axis) and the inclined angle Φ2 of the wall surface of the second Fresnel surface FSb. As shown in FIG. 4, in the entire range (effective diameter) of each of the first Fresnel surface FSa and the second Fresnel surface FSb, at a plurality of wall surfaces constituting the first Fresnel surface FSa and at a plurality of wall surfaces constituting the second Fresnel surface FSb, the inclined angles Φ1 of the wall surfaces of the first Fresnel surface FSa are larger than the inclined angles Φ2 of the respective wall surfaces on the second Fresnel surface FSb in the identical descending orders of proximity to the optical axis. The thickness of the first lens L1 (first Fresnel lens) on the optical axis is smaller than the thickness of the second lens L2 (second Fresnel lens) on the optical axis. The third lens L3 is an aspherical lens with both of the lens surfaces formed to have aspherical surface shapes. The third lens L3 is disposed such that the concave surface faces the image display 11.

The following Table 1 shows each data item in the first example.

TABLE 1

| [Data] |
|---|
| f = 23.75 |
| fR1 = 41.06 |
| fR2 = 52.36 |

TABLE 1-continued

| |
|---|
| fAS = −464.38 |
| ω = ±60° |
| ER = 10.00 |
| X1 = 27.59 |
| TL = 37.59 |

[Lens data]

| Surface number | R | D | nd | νd |
|---|---|---|---|---|
| 1 | ∞ | 1.32 | 1.6417 | 23.9 |
| 2*b | −26.345 | 0.11 | | |
| 3 | ∞ | 1.43 | 1.4929 | 57.1 |
| 4*b | −25.80658841 | 0.11 | | |
| 5*a | −103.07 | 5.5 | 1.6417 | 23.9 |
| 6*a | 74.9845136 | 19.12174528 | | |

[Aspherical surface data]

Second surface
K = 0.0000
A4 = −3.02E−06, A6 = 4.26E−08, A8 = 4.40E−12, A10 = −2.29E−14, A12 = 3.82E−18
A14 = −1.21E−20, A16 = 1.34E−22, A18 = −1.71E−25, A20 = 1.54E−29
Fourth surface
K = − 4.8481
A4 = 0.00E+00, A6 = −1.31E−08, A8 = 1.49E−11, A10 = −1.72E−14, A12 = −3.05E−17
A14 = 2.43E−20, A16 = 3.81E−23, A18 = −5.73E−27, A20 = −1.08E−29
Fifth surface
K = 0.0000
A4 = − 3.64E−06, A6 = 5.06E−08, A8 = − 6.35E−11, A10 = 4.79E−14, A12 = − 1.06E−16
A14 = 1.78E−19, A16 = − 1.82E−22, A18 = 1.21E−25, A20 = − 3.69E−29
Sixth surface
K = 0.0000
A4 = −1.26E−05, A6 = 2.09E−08, A8 = 2.53E−12, A10 = 2.06E−14, A12 = −9.58E−17
A14 = 3.18E−20, A16 = −5.92E−23, A18 = 1.08E−26, A20 = 1.67E−28

[Fresnel surface data]

| | In range of radius of 10 mm | In range of effective diameter |
|---|---|---|
| Φ1mx | 14.52° | 17.06° |
| Φ2mx | 3.75° | 6.27° |
| Φ1av | 9.79° | 13.33° |
| Φ2av | 2.54° | 3.89° |
| AS1 | 0.40 | 0.55 |
| AS2 | 0.32 | 0.78 |
| SG1 | 0.40 | 0.40 |
| SG2 | 0.40 | 0.40 |

[Conditional expression corresponding value]

Conditional expression (1) Φ1mx/Φ2mx = 3.9(radius of 10 mm), 2.7(effective diameter)
Conditional expression (2) Φ1av/Φ2av = 3.9(radius of 10 mm) , 3.4(effective diameter)
Conditional expression (3) fR1/fR2 = 0.8
Conditional expression (4) AS1 = 0.55
Conditional expression (5) AS2 = 0.78
Conditional expression (6) (2 × ω)/TL = 3.2
Conditional expression (7) X1/TL = 0.73
Conditional expression (8) 1 − (SG1/TH1) = 0.70
Conditional expression (9) 1 − (SG2/TH2) = 0.72

Figure 2:
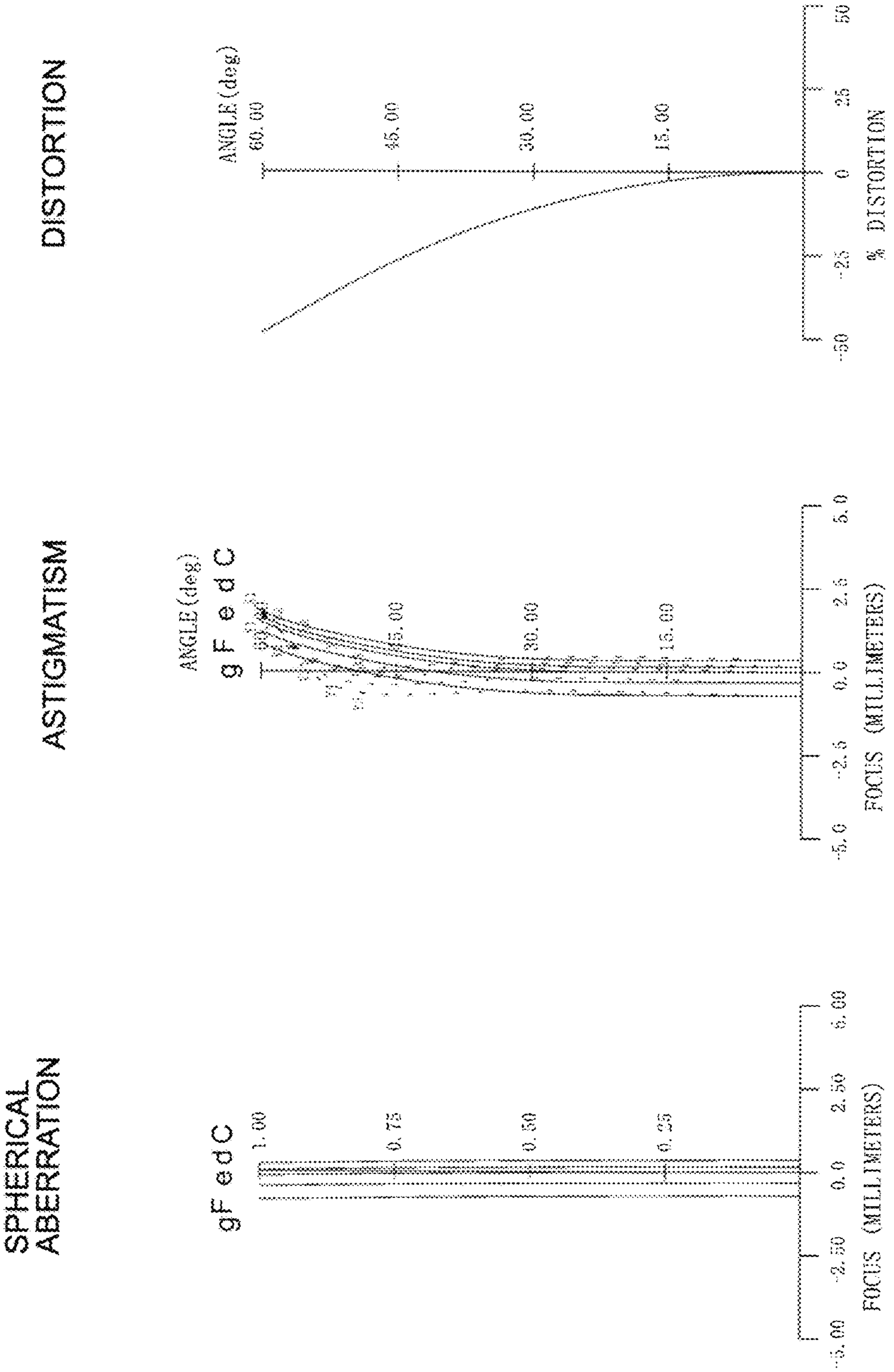
FIG. 2 is various aberration graphs of the ocular optical system according to the first example.
Figure 3:
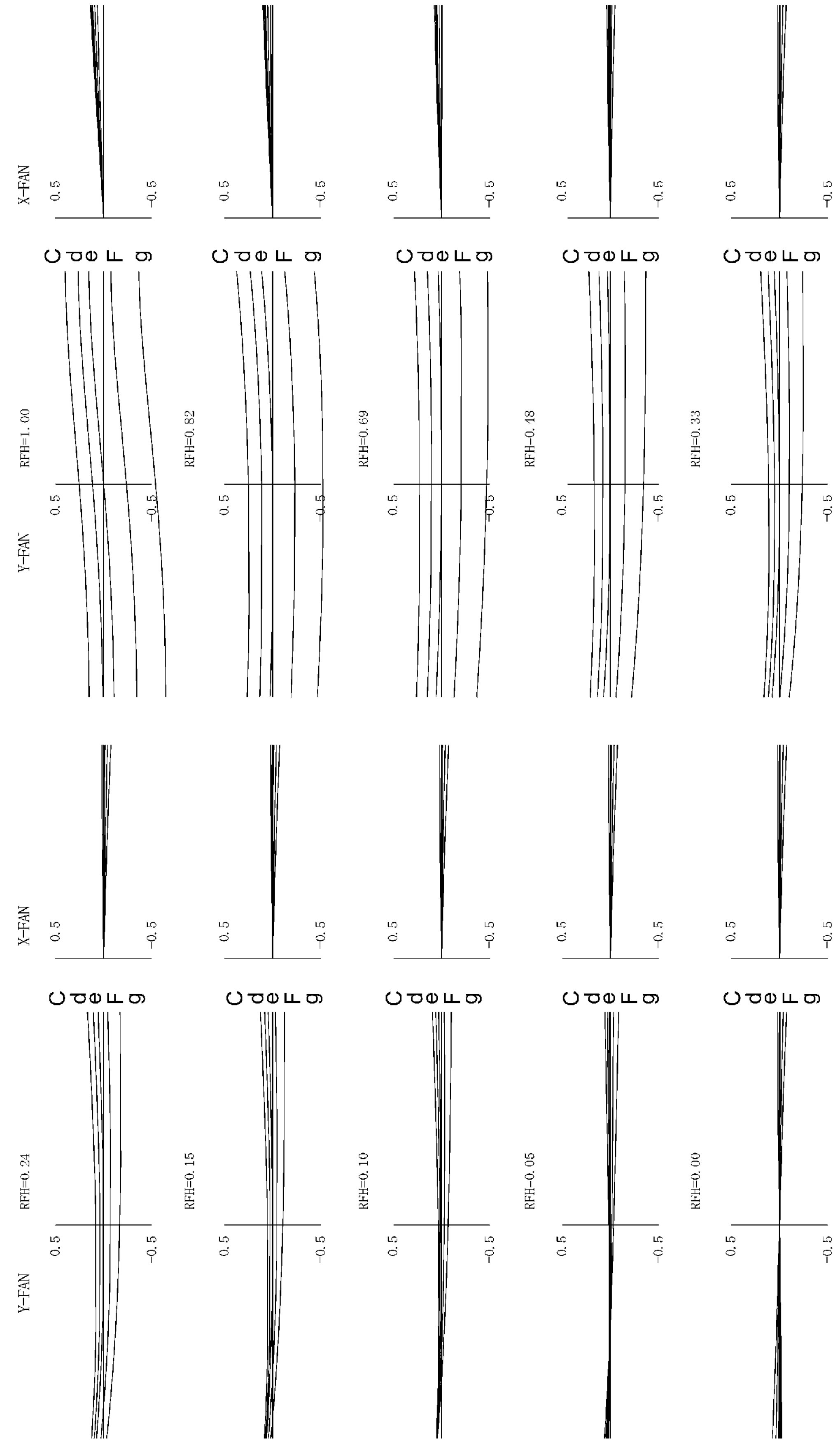
FIG. 3 is lateral aberration graphs of the ocular optical system according to the first example.

FIG. 2 is various aberration graphs of the ocular optical system according to the first example. FIG. 3 is lateral aberration graphs of the ocular optical system according to the first example. In each aberration graph, d denotes d-line (wavelength λ=587.6 nm), e denotes e-line (wavelength λ=546.1 nm), g denotes g-line (wavelength λ=435.8 nm), C denotes C-line (wavelength λ=656.3 nm), and F denotes F-line (wavelength λ=486.1 nm). In the astigmatism graph, solid lines indicate sagittal image surfaces, and broken lines indicate meridional image surfaces respectively. In the lateral aberration graph, RFH denotes the Relative Field Height. Note that also in the aberration graphs of each example described below, symbols similar to those in this example are used, and redundant description is omitted. Each aberration graph demonstrates that in the first example, various aberrations are favorably corrected, and an excellent image forming performance is achieved.

Second Example

Figure 5:
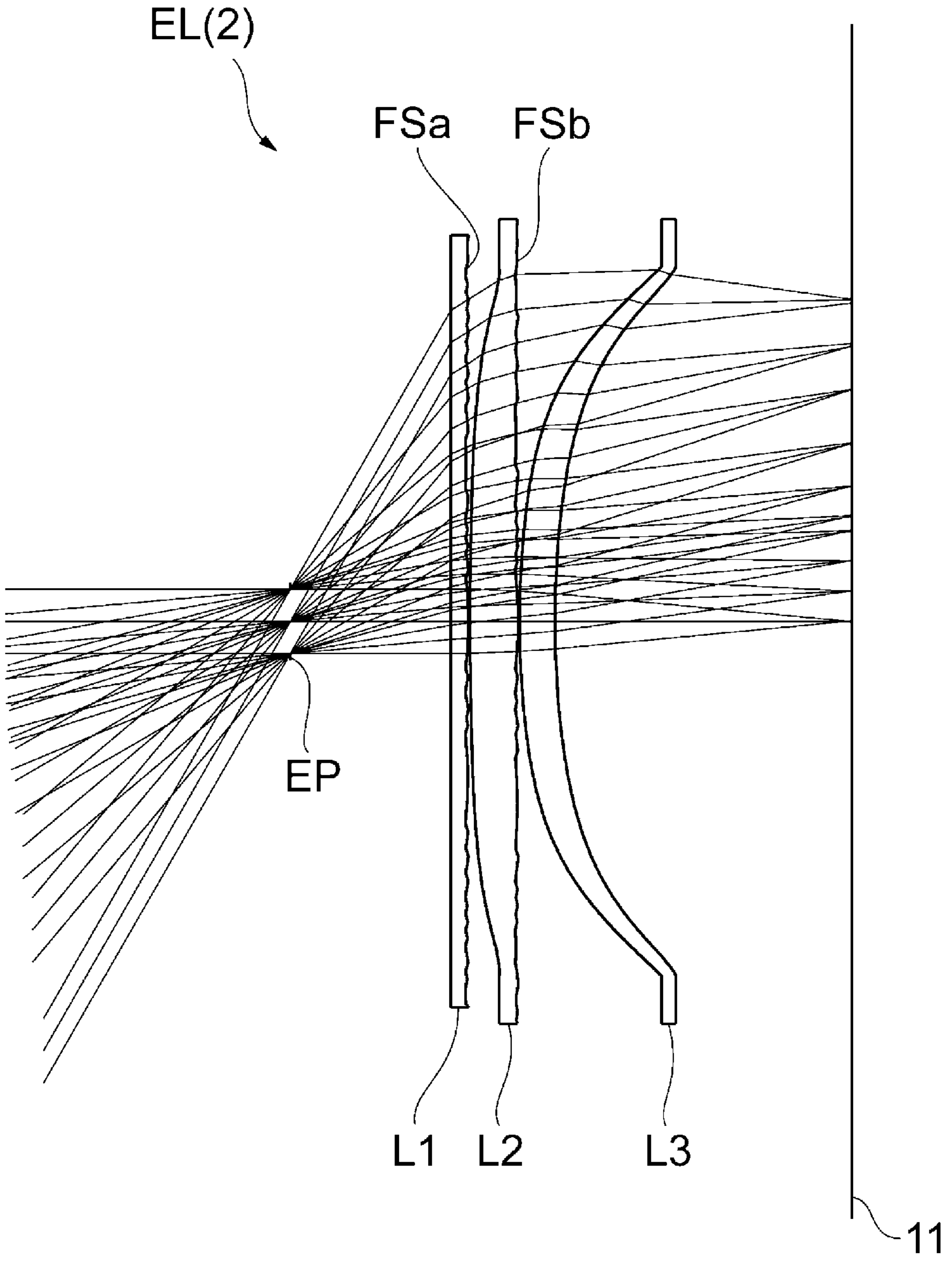
FIG. 5 is a lens configuration diagram of an ocular optical system according to a second example.

Hereinafter, a second example of the present application is described with reference to FIGS. 5 to 7 and Table 2. FIG. 5 is a lens configuration diagram of an ocular optical system EL(2) according to the second example. The ocular optical system EL(2) according to the second example includes, in an order sequentially from the eye point EP: a plano-convex first lens L1 having a positive refractive power; a biconvex second lens L2 having a positive refractive power; and a meniscus third lens L3 having a positive refractive power.

The first lens L1 is a first Fresnel lens including an aspherical-shaped first Fresnel surface FSa formed on a lens surface facing the image display 11 (observation object). The second lens L2 is a second Fresnel lens including an aspherical-shaped second Fresnel surface FSb formed on a lens surface facing the image display 11. In the entire range (effective diameter) of each of the first Fresnel surface FSa and the second Fresnel surface FSb, at a plurality of wall surfaces constituting the first Fresnel surface FSa and at a plurality of wall surfaces constituting the second Fresnel surface FSb, the inclined angles Φ1 of the wall surfaces of the first Fresnel surface FSa (from the optical axis) are larger than the inclined angles Φ2 of the respective wall surfaces on the second Fresnel surface FSb in the identical descending orders of proximity to the optical axis. The thickness of the first lens L1 (first Fresnel lens) on the optical axis is smaller than the thickness of the second lens L2 (second Fresnel lens) on the optical axis. The third lens L3 is an aspherical lens with both of the lens surfaces formed to have aspherical surface shapes. The third lens L3 is disposed such that the concave surface faces the image display 11.

The following Table 2 shows each data item in the second example.

TABLE 2

[Data]

f = 21.43
fR1 = 38.85
fR2 = 47.20
fAS = 5259.46
ω = ±60°
ER = 10.00
X1 = 25.00
TL = 35.00

[Lens data]

| Surface number | R | D | nd | νd |
|---|---|---|---|---|
| 1 | ∞ | 1.1 | 1.6417 | 23.9 |
| 2*b | −24.93289768 | 0.1 | | |
| 3*a | 285.5784198 | 3.0 | 1.4929 | 57.1 |
| 4*b | −25.23933282 | 0.1 | | |
| 5*a | 62.44932864 | 2.2 | 1.6417 | 23.9 |
| 6*a | 62.75050821 | 18.49922142 | | |

[Aspherical surface data]

Second surface
K = 0.0000
A4 = −4.64E−07, A6 = 6.19E−08, A8 = −1.98E−11, A10 = −7.69E−14, A12 = 7. 49E−17
A14 = −2.68E−19, A16 = 5.85E−22, A18 = −7.31E−25, A20 = 1.26E−27
Third surface
K = 131.6841
A4 = 0.00E+00, A6 = 8.32E−09, A8 = 1.10E−11, A10 = 2.56E−16, A12 = 1.51E−17
A14 = −9.59E−20, A16 = 5.42E−23, A18 = −1.52E−25, A20 = −6.15E−28
Fourth surface
K = −2.8009
A4 = 0.00E+00, A6 = −8.67E−09, A8 = 1.23E−11, A10 = −9.93E−15, A12 = −3.43E−17
A14 = −3.00E−20, A16 = 0.00E+00, A18 = 0.00E+00, A20 = 0.00E+00
Fifth surface
K = 5.6643
A4 = 0.00E+00, A6 = 8.80E−08, A8 = −1.01E−10, A10 = −4.09E−14, A12 = 0.00E+00
A14 = 0.00E+00, A16 = 0.00E+00, A18 = 0.00E+00, A20 = 0.00E+00
Sixth surface
K = 0.0000
A4 = 3.32E−06, A6 = 4.74E−08, A8 = −4. 93E−11, A10 = 9.21E−14, A12 = −1. 65E−16
A14 = 1.81E−19, A16 = −1.02E−22, A18 = −3.35E−25, A20 = −7.80E−28

[Fresnel surface data]

| | In range of radius of 10 mm | In range of effective diameter |
|---|---|---|
| Φ1mx | 14.52° | 17.23° |
| Φ2mx | 1.98° | 2.27° |
| Φ1av | 9.74° | 13.19° |
| Φ2av | 1.66° | 1.94° |
| AS1 | 0.40 | 0.63 |
| AS2 | 0.35 | 1.04 |
| SG1 | 0.40 | 0.40 |
| SG2 | 0.40 | 0.40 |

TABLE 2-continued

| [Conditional expression corresponding value] |
|---|
| Conditional expression (1) Φ1mx/Φ2mx = 7.3(radius of 10 mm), 7.6(effective diameter) |
| Conditional expression (2) Φ1av/Φ2av = 5.9(radius of 10 mm) , 6.8(effective diameter) |
| Conditional expression (3) fR1/fR2 = 0.8 |
| Conditional expression (4) AS1 = 0.63 |
| Conditional expression (5) AS2 = 1.04 |
| Conditional expression (6) (2 × ω)/TL = 3.4 |
| Conditional expression (7) X1/TL = 0.71 |
| Conditional expression (8) 1 − (SG1/TH1) = 0.64 |
| Conditional expression (9) 1 − (SG2/TH2) = 0.87 |

Figure 6:
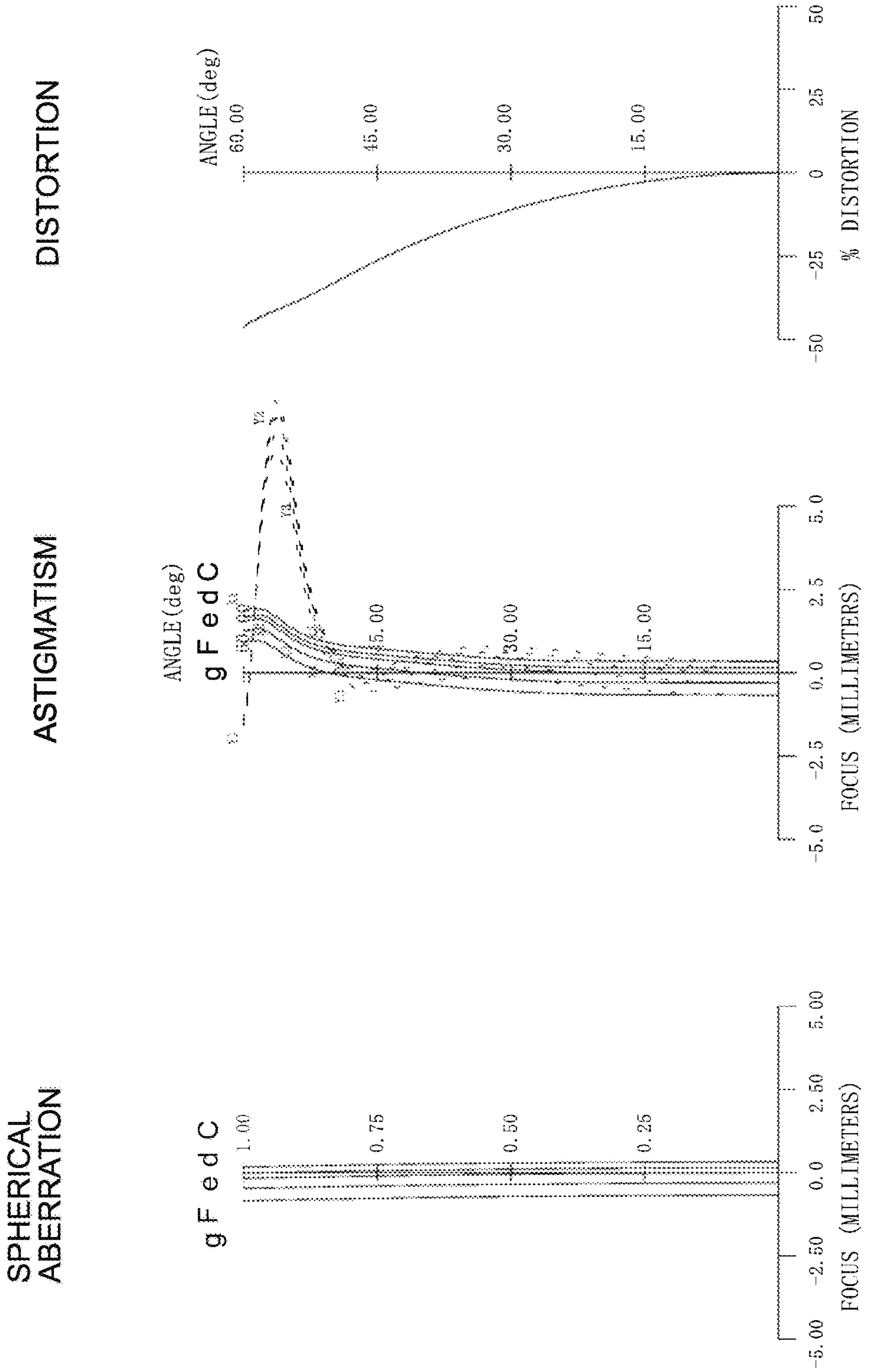
FIG. 6 is various aberration graphs of the ocular optical system according to the second example.
Figure 7:
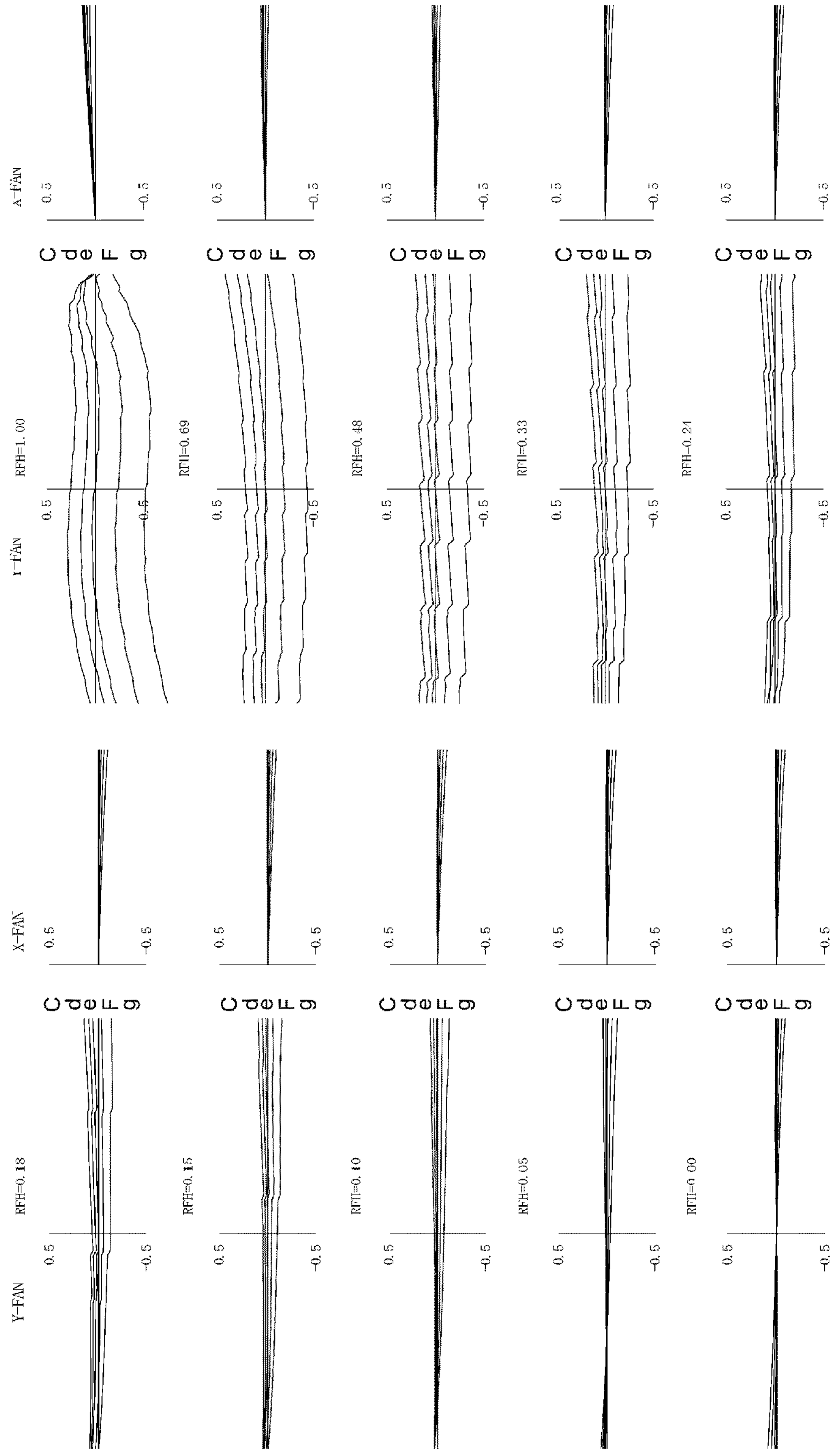
FIG. 7 is lateral aberration graphs of the ocular optical system according to the second example.

FIG. 6 is various aberration graphs of the ocular optical system according to the second example. FIG. 7 is lateral aberration graphs of the ocular optical system according to the second example. Each aberration graph demonstrates that in the second example, various aberrations are favorably corrected, and an excellent image forming performance is achieved.

Third Example

Figure 8:
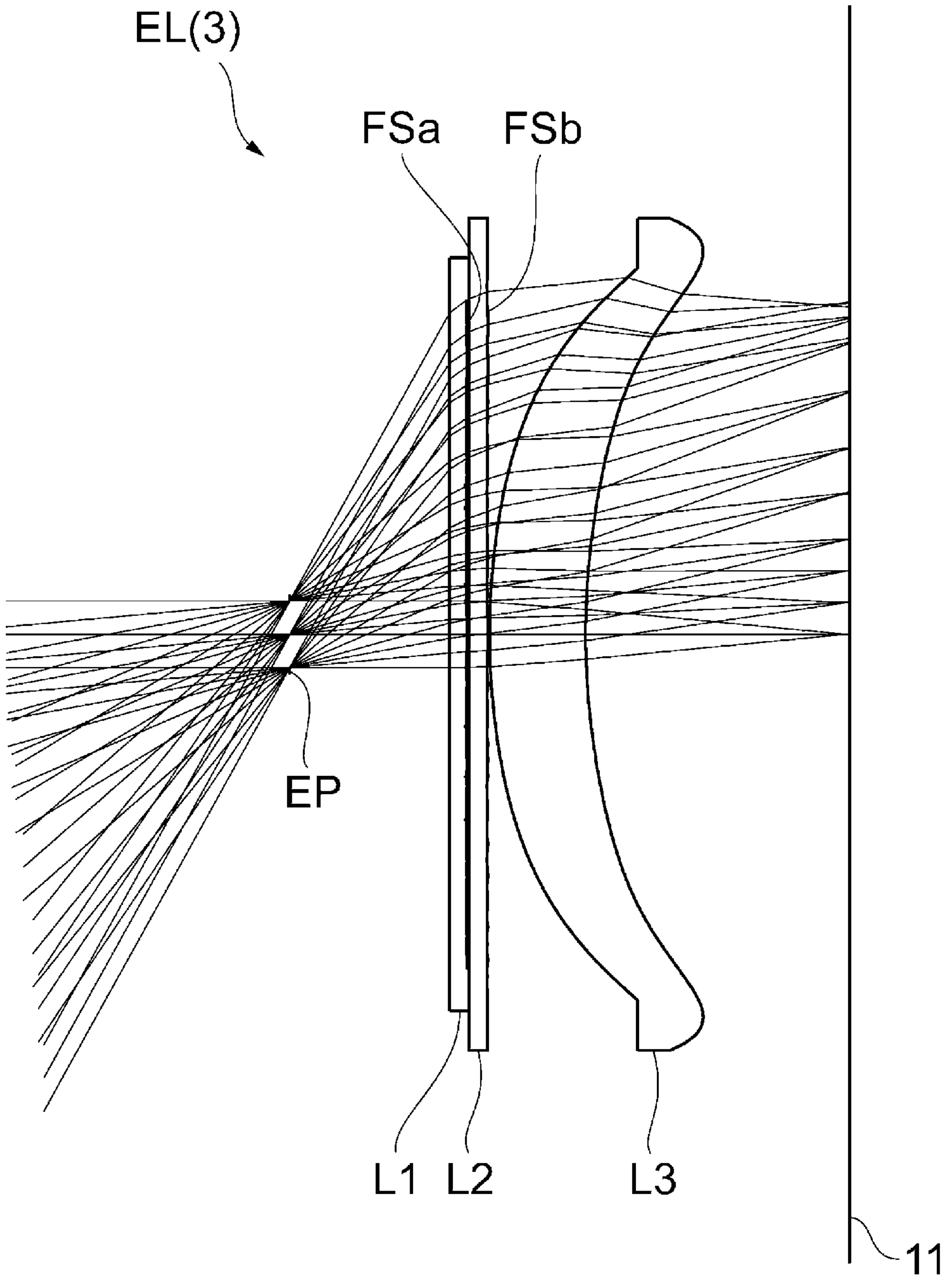
FIG. 8 is a lens configuration diagram of an ocular optical system according to a third example.

Hereinafter, a third example of the present application is described with reference to FIGS. 8 to 10 and Table 3. FIG. 8 is a lens configuration diagram of an ocular optical system EL(3) according to the third example. The ocular optical system EL(3) according to the third example includes, in an order sequentially from the eye point EP: a plano-convex first lens L1 having a positive refractive power; a plano-convex second lens L2 having a positive refractive power; and a meniscus third lens L3 having a positive refractive power.

The first lens L1 is a first Fresnel lens including an aspherical-shaped first Fresnel surface FSa formed on a lens surface facing the image display 11 (observation object). The second lens L2 is a second Fresnel lens including an aspherical-shaped second Fresnel surface FSb formed on a lens surface facing the image display 11. In the entire range (effective diameter) of each of the first Fresnel surface FSa and the second Fresnel surface FSb, at a plurality of wall surfaces constituting the first Fresnel surface FSa and at a plurality of wall surfaces constituting the second Fresnel surface FSb, the inclined angles Φ1 of the wall surfaces of the first Fresnel surface FSa (from the optical axis) are larger than the inclined angles Φ2 of the respective wall surfaces on the second Fresnel surface FSb in the identical descending orders of proximity to the optical axis. The thickness of the first lens L1 (first Fresnel lens) on the optical axis is smaller than the thickness of the second lens L2 (second Fresnel lens) on the optical axis. The third lens L3 is an aspherical lens with both of the lens surfaces formed to have aspherical surface shapes. The third lens L3 is disposed such that the concave surface faces the image display 11.

The following Table 3 shows each data item in the third example.

TABLE 3

| [Data] |
|---|
| f = 21.83 |
| fR1 = 45.93 |
| fR2 = 45.72 |
| fAS = 1697.11 |
| ω = ±60° |
| ER = 10.00 |
| X1 = 25.02 |
| TL = 35.02 |

[Lens data]

| Surface number | R | D | nd | νd |
|---|---|---|---|---|
| 1 | ∞ | 1.1 | 1.4929 | 57.1 |
| 2*b | −22.63809936 | 0.1 | | |
| 3 | ∞ | 1.2 | 1.4929 | 57.1 |
| 4*b | −22.53696051 | 0.1 | | |
| 5*a | 42.28425339 | 6.0 | 1.4929 | 57.1 |
| 6*a | 42.44901922 | 16.51779778 | | |

[Aspherical surface data]

Second surface
K = 0.0000
A4 = −6.48E−06, A6 = 5.57E−08, A8 = −2.56E−12, A10 = −1.96E−14, A12 = 1. 12E−17
A14 = −2.83E−19, A16 = 6.60E−22, A18 = −4.59E−25, A20 = 2.04E−27
Fourth surface
K = −3.0432
A4 = 0.00E+00, A6 = −1.36E−08, A8 = 1.99E−11, A10 = −6.89E−14, A12 = −6.72E−17
A14 = −1.51E−21, A16 = 3.45E−22, A18 = 0.00E+00, A20 = 0.00E+00
Fifth surface
K = 0.0000

TABLE 3-continued

| |
|---|
| A4 = −2.98E−06, A6 = 7.93E−08, A8 = −1.48E−10, A10 = 1. 42E−13, A12 = −2.25E−16 |
| A14 = 7.13E−19, A16 = −7.41E−22, A18 = 3.69E−25, A20 = −1.01E−27 |
| Sixth surface |
| K = 0.0000 |
| A4 = −1.24E−05, A6 = 4.50E−08, A8 = 2. 30E−11, A10 = 2. 93E−14, A12 = −2. 78E−16 |
| A14 = 9.06E−20, A16 = −1.03E−22, A18 = −1.48E−26, A20 = 5.03E−29 |

[Fresnel surface data]

| | In range of radius of 10 mm | In range of effective diameter |
|---|---|---|
| Φ1mx | 15.98° | 18.60° |
| Φ2mx | 3.71° | 4.46° |
| Φ1av | 10.58° | 14.22° |
| Φ2av | 2.46° | 3.47° |
| AS1 | 0.49 | 1.00 |
| AS2 | 0.38 | 1.01 |
| SG1 | 0.40 | 0.40 |
| SG2 | 0.40 | 0.40 |

[Conditional expression corresponding value]

| |
|---|
| Conditional expression (1) Φ1mx/Φ2mx = 4.3(radius of 10 mm), 4.2(effective diameter) |
| Conditional expression (2) Φ1av/Φ2av = 4.3(radius of 10 mm) , 4.1(effective diameter) |
| Conditional expression (3) fR1/fR2 = 1.0 |
| Conditional expression (4) AS1 = 1.00 |
| Conditional expression (5) AS2 = 1.01 |
| Conditional expression (6) (2 × ω)/TL = 3.4 |
| Conditional expression (7) X1/TL = 0.71 |
| Conditional expression (8) 1 − (SG1/TH1) = 0.64 |
| Conditional expression (9) 1 − (SG2/TH2) = 0.67 |

Figure 9:
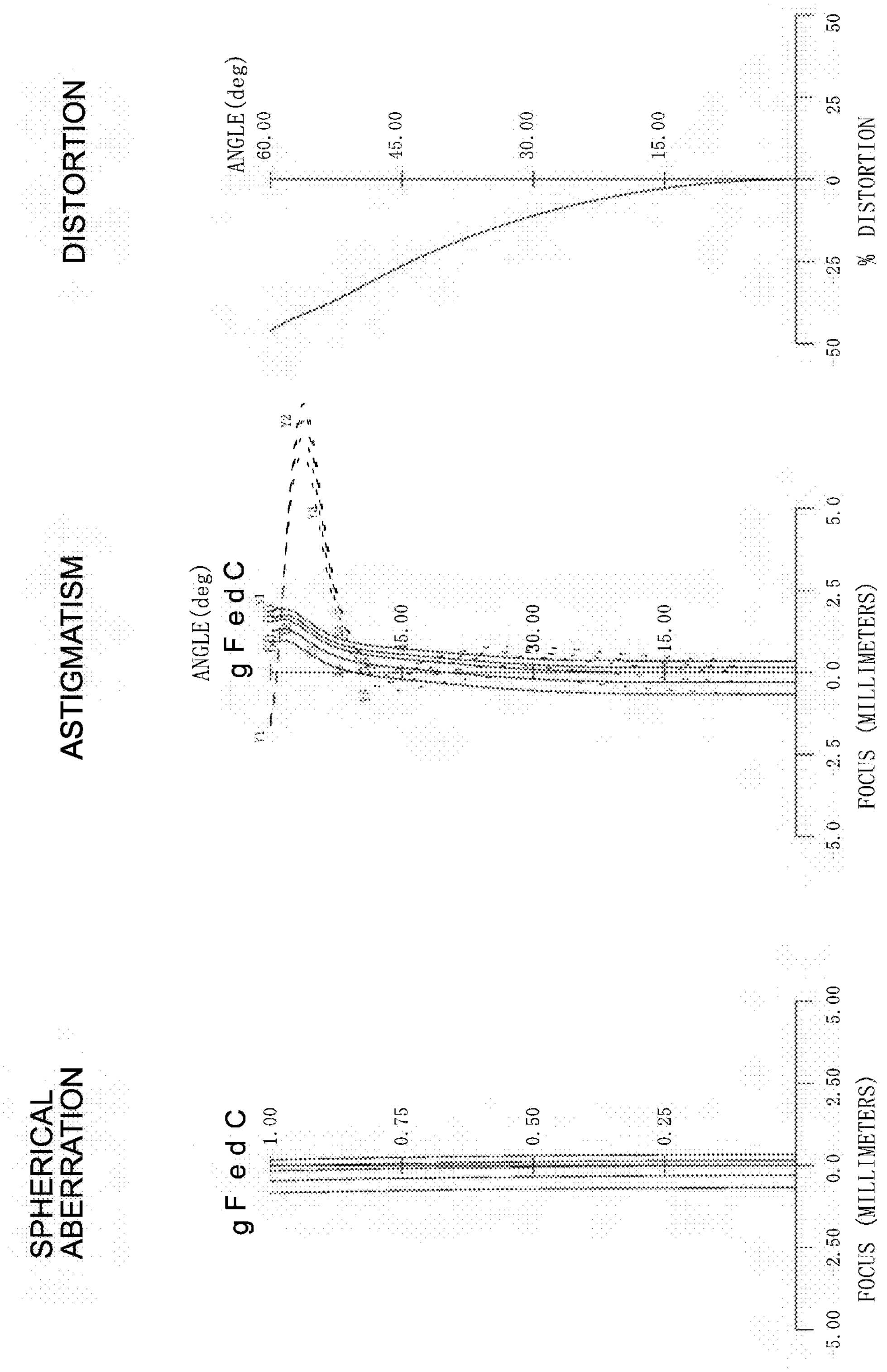
FIG. 9 is various aberration graphs of the ocular optical system according to the third example.
Figure 10:
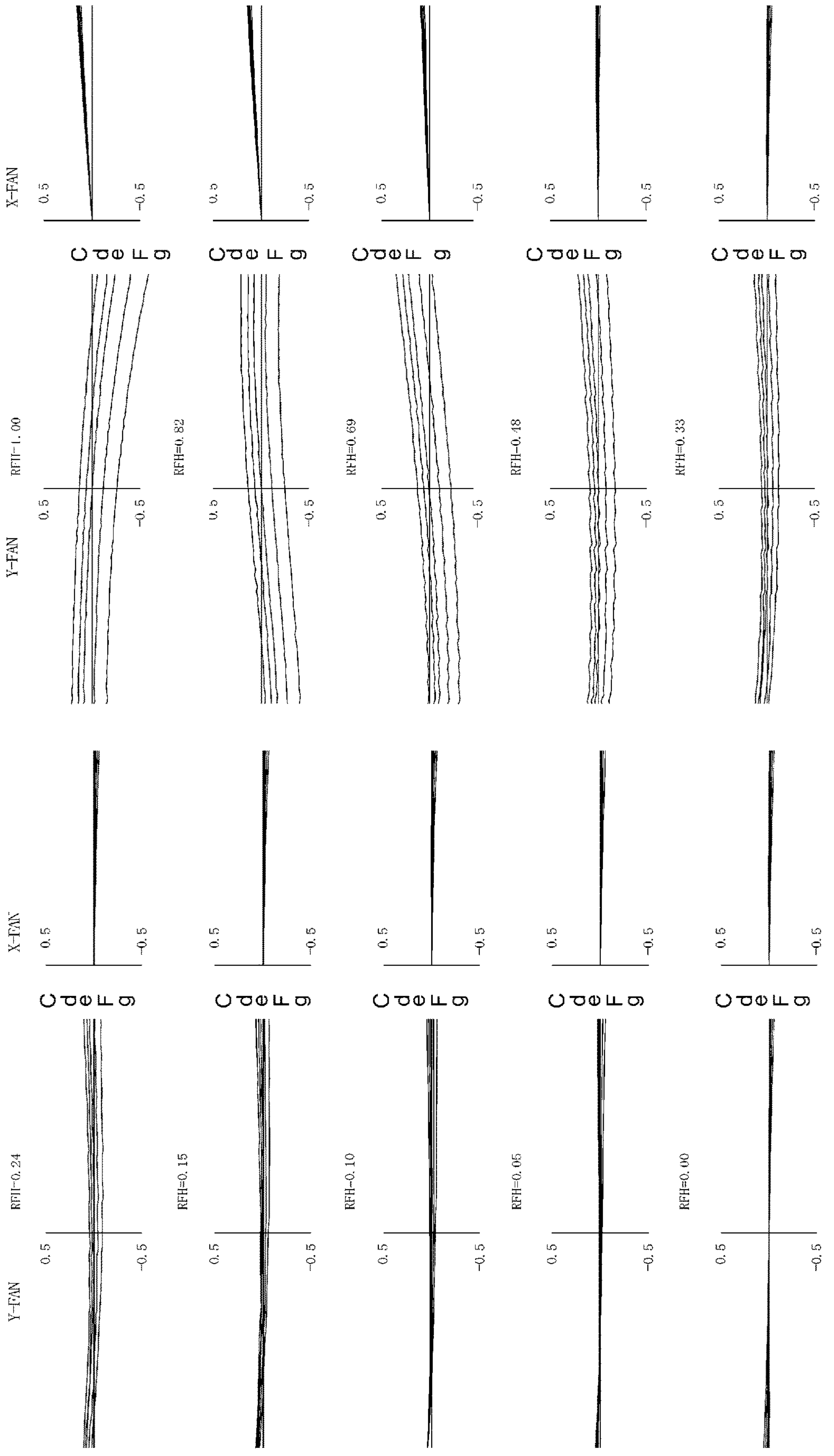
FIG. 10 is lateral aberration graphs of the ocular optical system according to the third example.

FIG. 9 is various aberration graphs of the ocular optical system according to the third example. FIG. 10 is lateral aberration graphs of the ocular optical system according to the third example. Each aberration graph demonstrates that in the third example, various aberrations are favorably corrected, and an excellent image forming performance is achieved.

Fourth Example

Figure 11:
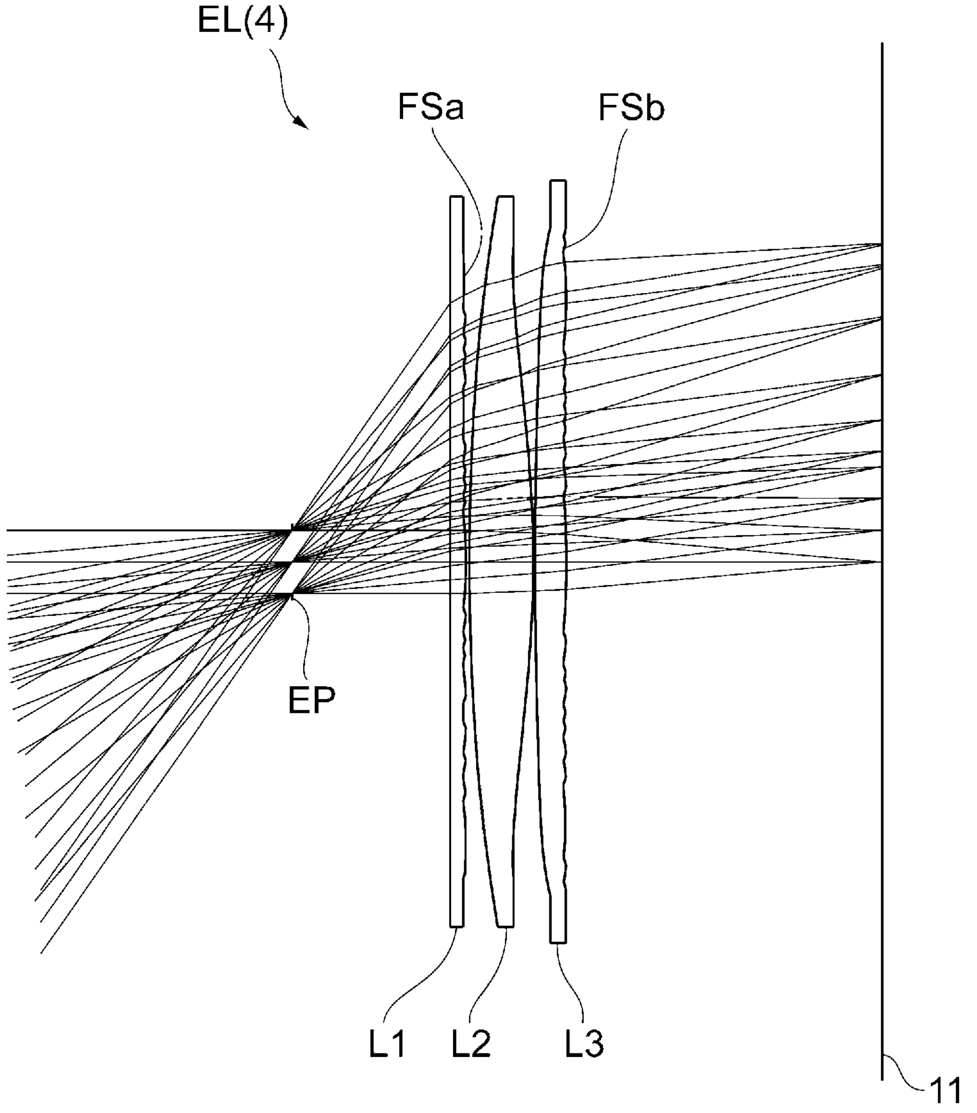
FIG. 11 is a lens configuration diagram of an ocular optical system according to a fourth example.

Hereinafter, a fourth example of the present application is described with reference to FIGS. 11 to 13 and Table 4. FIG. 11 is a lens configuration diagram of an ocular optical system EL(4) according to the fourth example. The ocular optical system EL(4) according to the fourth example includes, in an order sequentially from the eye point EP: a plano-convex first lens L1 having a positive refractive power; a biconvex second lens L2 having a positive refractive power; and a biconvex third lens L3 having a positive refractive power.

The first lens L1 is a first Fresnel lens including an aspherical-shaped first Fresnel surface FSa formed on a lens surface facing the image display 11 (observation object). The second lens L2 is an aspherical lens with both of the lens surfaces formed to have aspherical surface shapes. The third lens L3 is a second Fresnel lens including an aspherical-shaped second Fresnel surface FSb formed on a lens surface facing the image display 11. In the entire range (effective diameter) of each of the first Fresnel surface FSa and the second Fresnel surface FSb, at a plurality of wall surfaces constituting the first Fresnel surface FSa and at a plurality of wall surfaces constituting the second Fresnel surface FSb, the inclined angles Φ1 of the wall surfaces of the first Fresnel surface FSa (from the optical axis) are larger than the inclined angles Φ2 of the respective wall surfaces on the second Fresnel surface FSb in the identical descending orders of proximity to the optical axis. The thickness of the first lens L1 (first Fresnel lens) on the optical axis is smaller than the thickness of the third lens L3 (second Fresnel lens) on the optical axis.

The following Table 4 shows each data item in the fourth example.

TABLE 4

| [Data] |
|---|
| f = 22.88 |
| fR1 = 41.82 |
| fR2 = 88.17 |
| fAS = 96.83 |
| ω = ±55° |
| ER = 10.00 |
| X1 = 25.30 |
| TL = 37.29 |

TABLE 4-continued

| [Lens data] | | | | |
|---|---|---|---|---|
| Surface number | R | D | nd | νd |
| 1 | ∞ | 1.0 | 1.6417 | 23.9 |
| 2*b | −26.83854337 | 0.23 | | |
| 3*a | 169.4608931 | 4.02 | 1.4929 | 57.1 |
| 4*a | −65.92241449 | 0.1 | | |
| 5*a | 242.729204 | 2.2 | 1.4929 | 57.1 |
| 6*b | −52.78935144 | 19.9392062 | | |

[Aspherical surface data]

Second surface
K = 0.0000
A4 = − 1.14E−05, A6 = 5.21E−08, A8 = − 8.48E−11, A10 = 9.98E−14, A12 = 0.00E+00
A14 = 0.00E+00, A16−0.00E+00, A18−0.00E+00, A20−0.00E+00
Third surface
K = 0.0000
A4 = 7.15E−07, A6 = 0.00E+00, A8 = 0.00E+00, A10 = 0.00E+00, A12 = 0.00E+00
A14 = 0.00E+00, A16 = 0.00E+00, A18−0.00E+00, A20−0.00E+00
Fourth surface
K = 0.0000
A4 = 1.80E−05, A6 = − 5.08E−08, A8 = 2.05E−10, A10 = − 7.54E−13, A12 = 2.43E−15
A14 = − 5.85E−18, A16 = 9.73E−21, A18 = − 9.48E−24, A20 = 4.12E−27
Fifth surface
K = 0.0000
A4 = − 5.31E−06, A6 = 8.07E−09, A8 = 7.20E−12, A10 = 8.05E−15, A12 = 0.00E+00
A14 = 0.00E+00, A16−0.00E+00, A18 = 0.00E+00, A20 = 0.00E+00
Sixth surface
K = 0.0000
A4 = − 1.26E−06, A6 = − 3.27E−09, A8 = − 1.03E−11, A10 = 2.41E−14, A12 = − 8.99E−17
A14 = 2.24E−19, A16 = − 2.88E−22, A18 = 3.28E−25, A20 = − 1.26E−28

[Fresnel surface data]

| | In range of radius of 10 mm | In range of effective diameter |
|---|---|---|
| Φ1mx | 14.28° | 15.47° |
| Φ2mx | 0.99° | 0.99° |
| Φ1av | 9.83° | 8.02° |
| Φ2av | 0.81° | 0.28° |
| AS1 | 0.42 | 0.83 |
| AS2 | 0.20 | 0.58 |
| SG1 | 0.40 | 0.40 |
| SG2 | 0.40 | 0.40 |

[Conditional expression corresponding value]

Conditional expression (1) Φ1mx/Φ2mx = 14.4(radius of 10 mm), 15.6(effective diameter)
Conditional expression (2) Φ1av/Φ2av = 12.1(radius of 10 mm) , 28.6(effective diameter)
Conditional expression (3) fR1/fR2 = 0.5
Conditional expression (4) AS1 = 0.83
Conditional expression (5) AS2 = 0.58
Conditional expression (6) (2 × ω)/TL = 2.9
Conditional expression (7) X1/TL = 0.73
Conditional expression (8) 1 − (SG1/TH1) = 0.60
Conditional expression (9) 1 − (SG2/TH2) = 0.80

Figure 12:
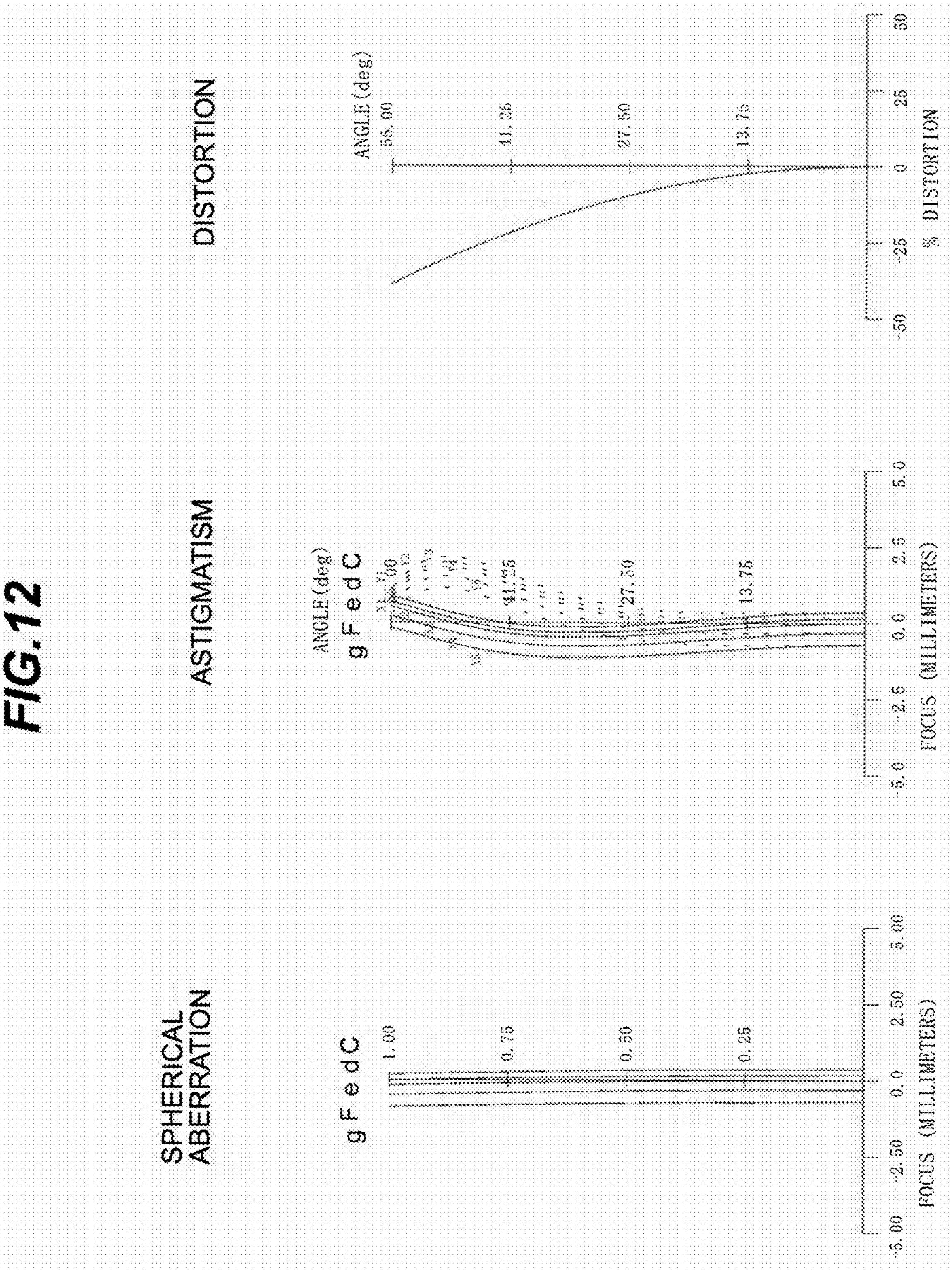
FIG. 12 is various aberration graphs of the ocular optical system according to the fourth example.
Figure 13:
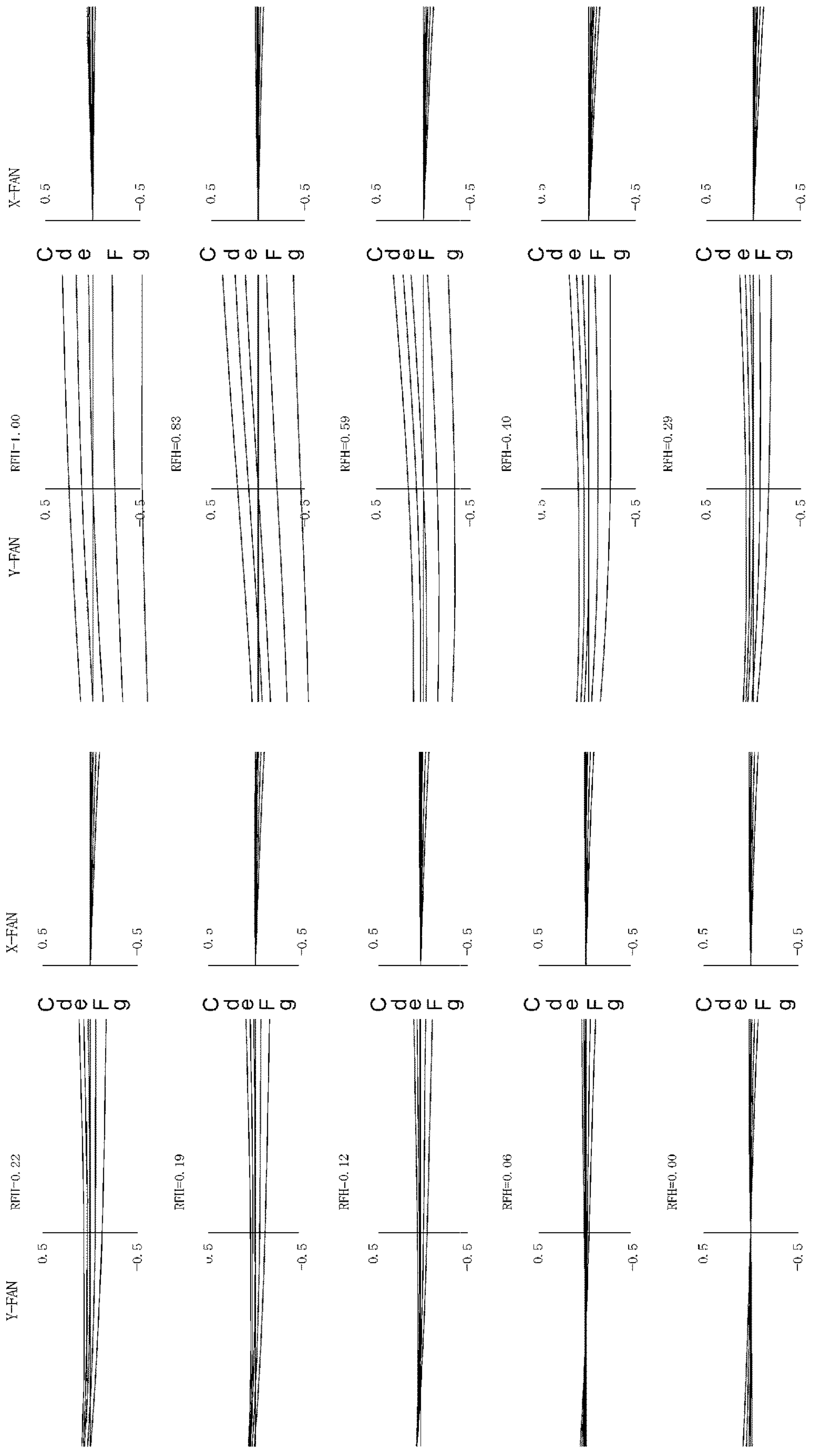
FIG. 13 is lateral aberration graphs of the ocular optical system according to the fourth example.

FIG. 12 is various aberration graphs of the ocular optical system according to the fourth example. FIG. 13 is lateral aberration graphs of the ocular optical system according to the fourth example. Each aberration graph demonstrates that in the fourth example, various aberrations are favorably corrected, and an excellent image forming performance is achieved.

Fifth Example

Figure 14:
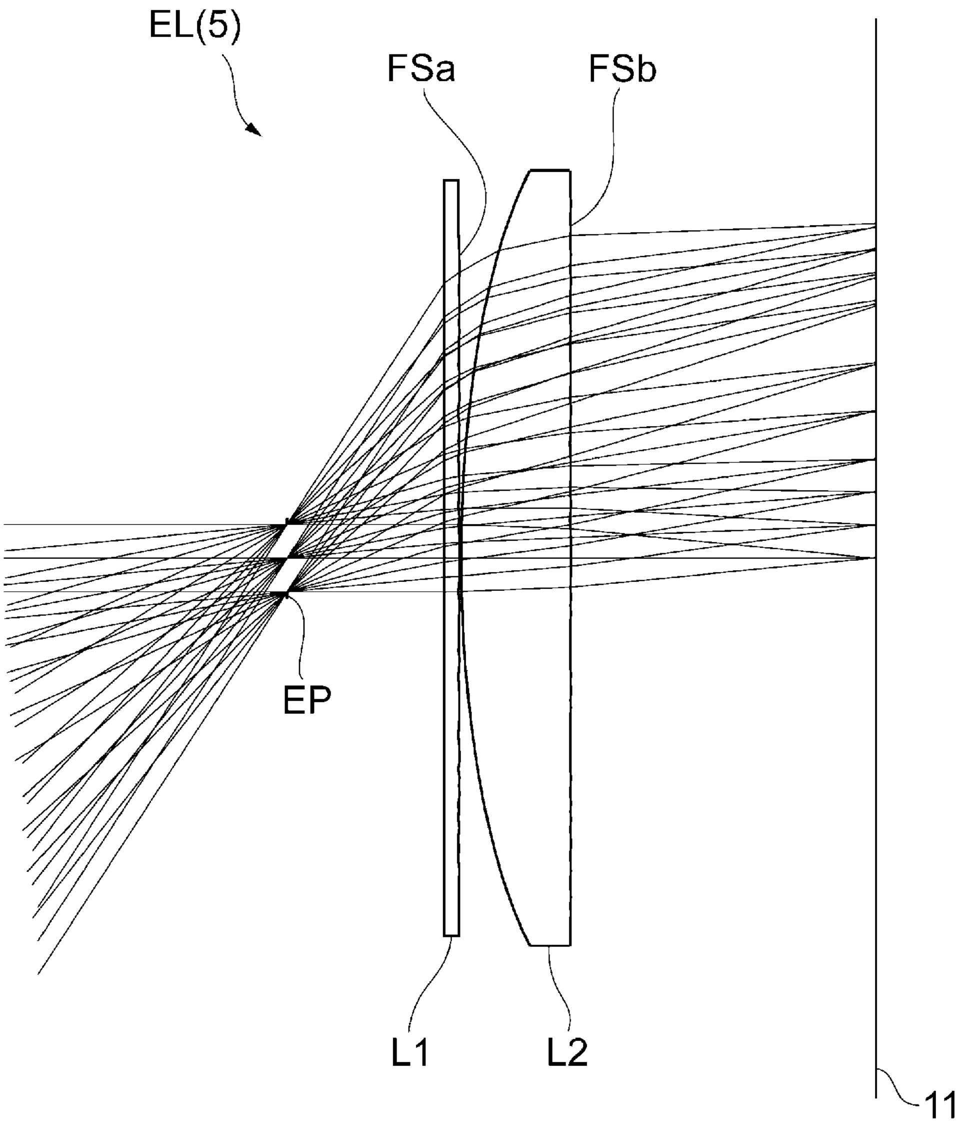
FIG. 14 is a lens configuration diagram of an ocular optical system according to a fifth example.

Hereinafter, a fifth example of the present application is described with reference to FIGS. 14 to 16 and Table 5. FIG. 14 is a lens configuration diagram of an ocular optical system EL(5) according to the fifth example. The ocular optical system EL(5) according to the fifth example includes, in an order sequentially from the eye point EP: a plano-convex first lens L1 having a positive refractive power; and a biconvex second lens L2 having a positive refractive power.

The first lens L1 is a first Fresnel lens including an aspherical-shaped first Fresnel surface FSa formed on a lens surface facing the image display 11 (observation object). The second lens L2 is a second Fresnel lens including an aspherical-shaped second Fresnel surface FSb formed on a lens surface facing the image display 11. In the entire range (effective diameter) of each of the first Fresnel surface FSa and the second Fresnel surface FSb, at a plurality of wall surfaces constituting the first Fresnel surface FSa and at a plurality of wall surfaces constituting the second Fresnel surface FSb, the inclined angles Φ1 of the wall surfaces of the first Fresnel surface FSa (from the optical axis) are larger than the inclined angles Φ2 of the respective wall surfaces on the second Fresnel surface FSb in the identical descending orders of proximity to the optical axis. The thickness of the first lens L1 (first Fresnel lens) on the optical axis is smaller than the thickness of the second lens L2 (second Fresnel lens) on the optical axis.

The following Table 5 shows each data item in the fifth example.

TABLE 5

[Data]

f = 22.40
fR1 = 45.48
fR2 = 40.54
ω = ±55°
ER = 10.00
X1 = 27.50
TL = 37.50

[Lens data]

| Surface number | R | D | nd | νd |
|---|---|---|---|---|
| 1 | 8 | 1.0 | 1.4929 | 57.1 |
| 2*b | −22.41921895 | 0.1 | | |
| 3*a | 80.0 | 7.0 | 1.4929 | 57.1 |
| 4*b | −25.86626893 | 19.4 | | |

[Aspherical surface data]

Second surface
K = − 0.9038
A4 = 0.00E+00, A6 = − 1.21E−08, A8 = − 9.16E−11, A10 = − 2.85E−14, A12 = 5.48E−16
A14 = 0.00E+00, A16−0.00E+00, A18 = 0.00E+00, A20 = 0.00E+00
Third surface
K = 8.0000
A4 = 0.00E+00, A6−0.00E+00, A8−0.00E+00, A10 = 0.00E+00, A12−0.00E+00
A14 = 0.00E+00, A16−0.00E+00, A18 = 0.00E+00, A20 = 0.00E+00
Fourth surface
K = − 0.9318
A4 = 0.00E+00, A6 = 2.60E−08, A8 = 1. 75E−10, A10 = − 9.77E−13, A12 = 2.57E−16
A14 = 4.85E−18, A16 = − 6.10E−21, A18 = 0.00E+00, A20 = 0.00E+00

[Fresnel surface data]

| | In range of radius of 10 mm | In range of effective diameter |
|---|---|---|
| Φ1mx | 16.09° | 18.83° |
| Φ2mx | 1.36° | 1.36° |
| Φ1av | 10.65° | 9.29° |
| Φ2av | 1.27° | 0.53° |
| AS1 | 0.46 | 1.06 |
| AS2 | 0.37 | 0.64 |
| SG1 | 0.40 | 0.40 |
| SG2 | 0.40 | 0.40 |

[Conditional expression corresponding value]

Conditional expression (1) Φ1mx/Φ2mx = 11.8(radius of 10 mm), 13.8(effective diameter)
Conditional expression (2) Φ1av/Φ2av = 8.4(radius of 10 mm) , 17.5(effective diameter)
Conditional expression (3) fR1/fR2 = 1.1
Conditional expression (4) AS1 = 1.06
Conditional expression (5) AS2 = 0.64
Conditional expression (6) (2 × ω)/TL = 2.9
Conditional expression (7) X1/TL = 0.73
Conditional expression (8) 1 − (SG1/TH1) = 0.60
Conditional expression (9) 1 − (SG2/TH2) = 0.94

Figure 15:
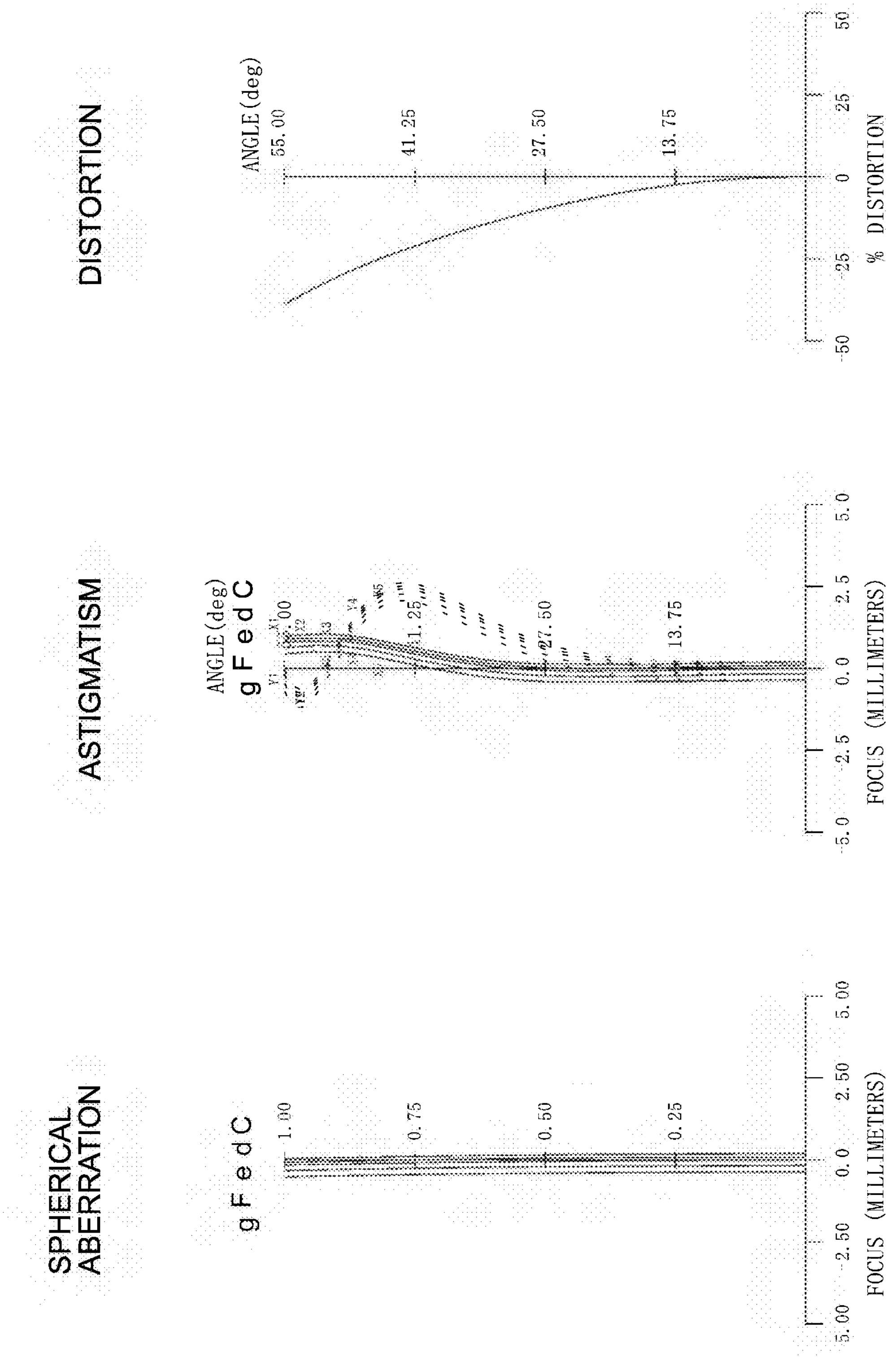
FIG. 15 is various aberration graphs of the ocular optical system according to the fifth example.
Figure 16:
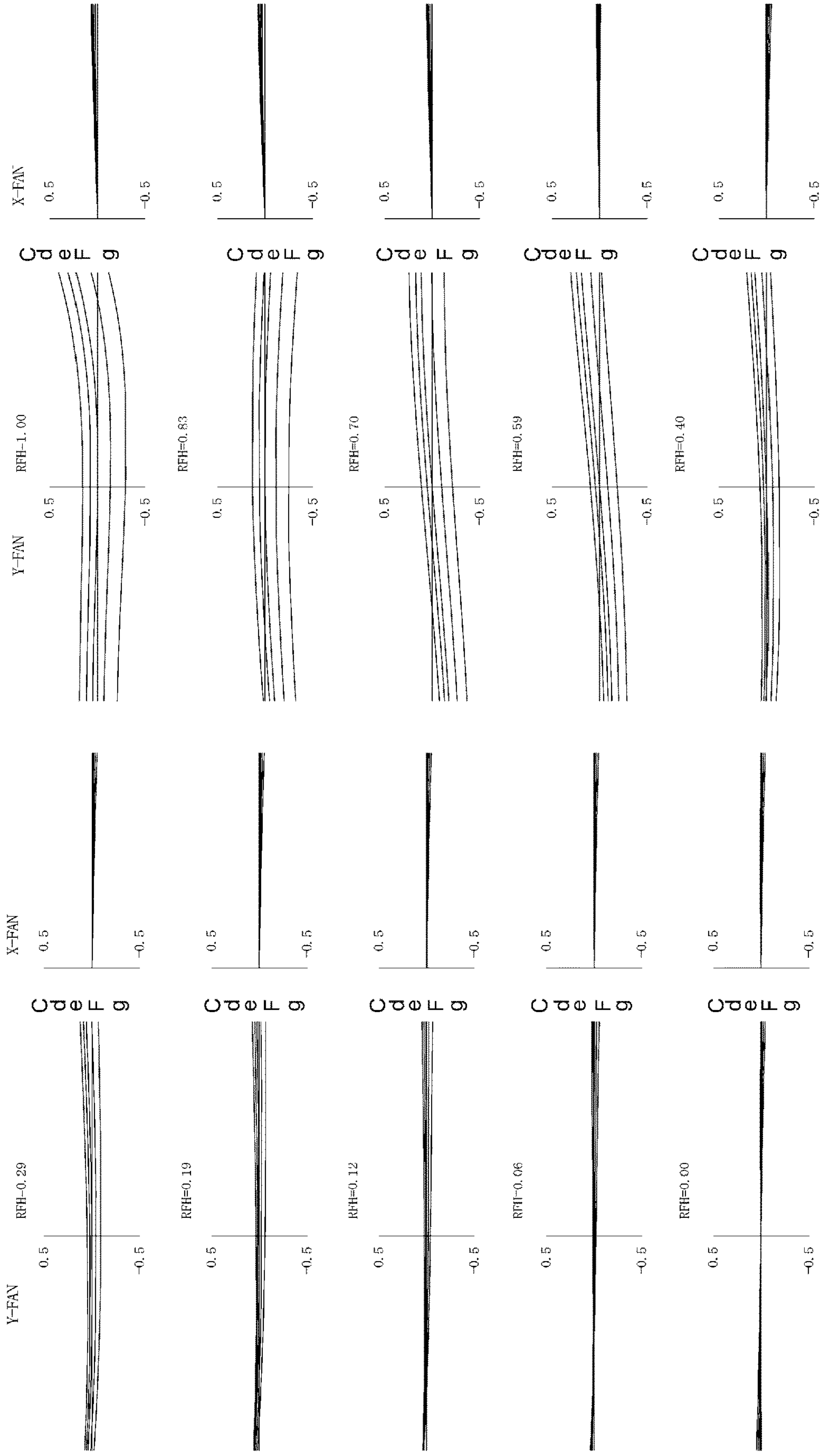
FIG. 16 is lateral aberration graphs of the ocular optical system according to the fifth example.

FIG. 15 is various aberration graphs of the ocular optical system according to the fifth example. FIG. 16 is lateral aberration graphs of the ocular optical system according to the fifth example. Each aberration graph demonstrates that in the fifth example, various aberrations are favorably corrected, and an excellent image forming performance is achieved.

Sixth Example

Figure 17:
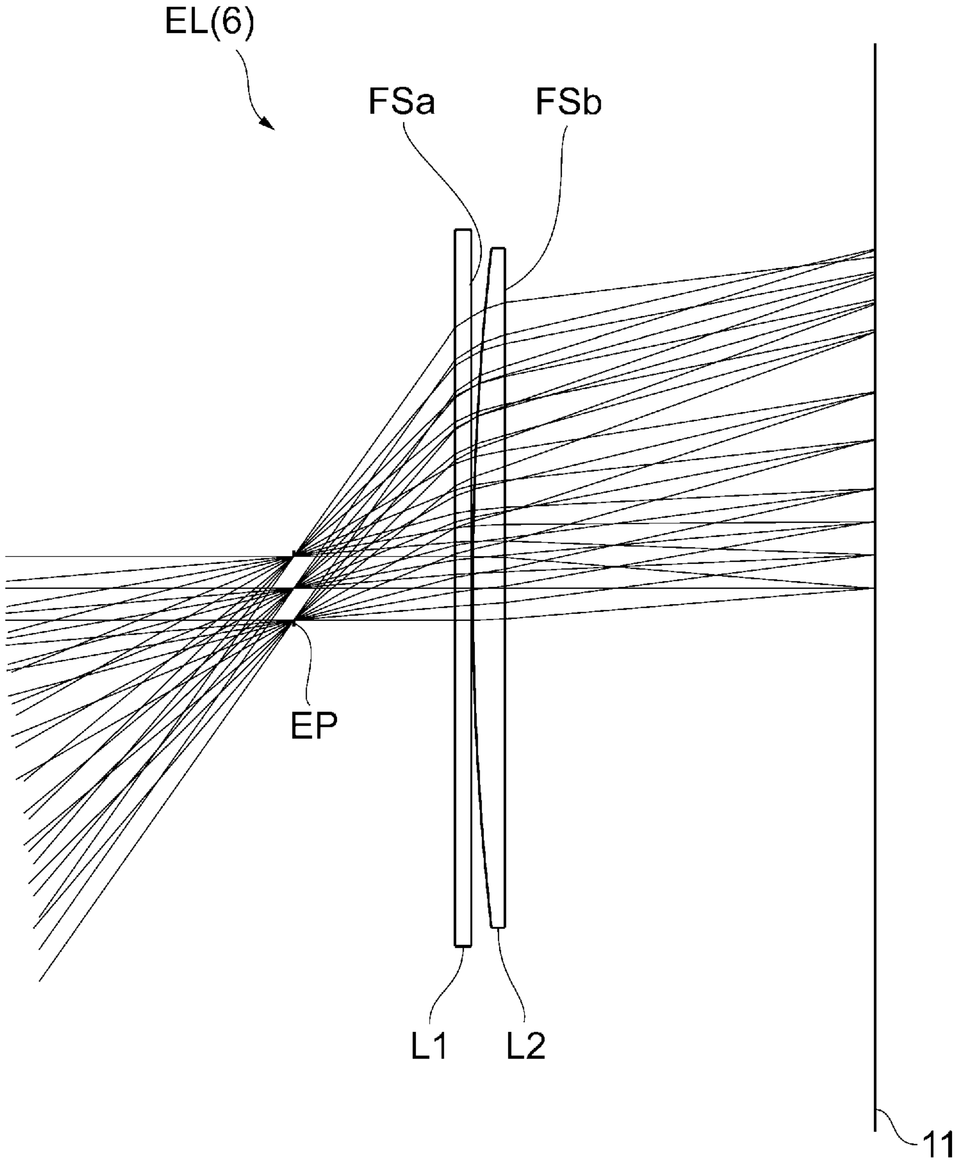
FIG. 17 is a lens configuration diagram of an ocular optical system according to a sixth example.

Hereinafter, a sixth example of the present application is described with reference to FIGS. 17 to 19 and Table 6. FIG. 17 is a lens configuration diagram of an ocular optical system EL(6) according to the sixth example. The ocular optical system EL(6) according to the sixth example includes, in an order sequentially from the eye point EP: a plano-convex first lens L1 having a positive refractive power; and a biconvex second lens L2 having a positive refractive power.

The first lens L1 is a first Fresnel lens including an aspherical-shaped first Fresnel surface FSa formed on a lens surface facing the image display 11 (observation object). The second lens L2 is a second Fresnel lens including an aspherical-shaped second Fresnel surface FSb formed on a lens surface facing the image display 11. In the entire range (effective diameter) of each of the first Fresnel surface FSa and the second Fresnel surface FSb, at a plurality of wall surfaces constituting the first Fresnel surface FSa and at a plurality of wall surfaces constituting the second Fresnel surface FSb, the inclined angles Φ1 of the wall surfaces of the first Fresnel surface FSa (from the optical axis) are larger than the inclined angles Φ2 of the respective wall surfaces on the second Fresnel surface FSb in the identical descending orders of proximity to the optical axis. The thickness of the first lens L1 (first Fresnel lens) on the optical axis is smaller than the thickness of the second lens L2 (second Fresnel lens) on the optical axis.

The following Table 6 shows each data item in the sixth example.

TABLE 6

[Data]

f = 23.82
fR1 = 44.35
fR2 = 49.98
ω = ±55°
ER = 10.00
X1 = 26.10
TL = 36.10

[Lens data]

| Surface number | R | D | nd | νd |
|---|---|---|---|---|
| 1 | 8 | 1.0 | 1.4929 | 57.1 |
| 2*b | −21.85902417 | 0.1 | | |
| 3*a | 200.0 | 2.0 | 1.4929 | 57.1 |
| 4*b | −28.0 | 22.96794732 | | |

[Aspherical surface data]

Second surface
K = − 0.8947
A4 = 0.00E+00, A6 = − 1.03E−08, A8 = − 7.80E−11, A10 = − 2.51E−15, A12 = 7.46E−16
A14 = 4.47E−20, A16 = 0.00E+00, A18–0.00E+00, A20 = 0.00E+00
Third surface
K = 8.0000
A4 = 0.00E+00, A6–0.00E+00, A8 = 0.00E+00, A10 = 0.00E+00, A12 = 0.00E+00
A14 = 0.00E+00, A16 = 0.00E+00, A18 = 0.00E+00, A20 = 0.00E+00
Fourth surface
K = − 0.7110
A4 = 0.00E+00, A6 = 1.41E−08, A8 = 3.51E−12, A10 = − 1.96E−13, A12 = 2.81E−15
A14 = − 1.26E−17, A16 = 1.50E−20, A18 = 0.00E+00, A20 = 0.00E+00

[Fresnel surface data]

| | In range of radius of 10 mm | In range of effective diameter |
|---|---|---|
| Φ1mx | 15.94° | 18.53° |
| Φ2mx | 3.12° | 3.12° |
| Φ1av | 10.58° | 9.19° |
| Φ2av | 2.32° | 1.46° |
| AS1 | 0.47 | 0.84 |
| AS2 | 0.36 | 1.17 |
| SG1 | 0.40 | 0.40 |
| SG2 | 0.40 | 0.40 |

[Conditional expression corresponding value]

Conditional expression (1) Φ1mx/Φ2mx = 5.1(radius of 10 mm), 5.9(effective diameter)
Conditional expression (2) Φ1av/Φ2av = 4.6(radius of 10 mm) , 6.3(effective diameter)
Conditional expression (3) fR1/fR2 = 0.9
Conditional expression (4) AS1 = 0.84

TABLE 6-continued

| |
|---|
| Conditional expression (5) AS2 = 1.17 |
| Conditional expression (6) (2 × ω)/TL = 3.0 |
| Conditional expression (7) X1/TL = 0.72 |
| Conditional expression (8) 1 − (SG1/TH1) = 0.60 |
| Conditional expression (9) 1 − (SG2/TH2) = 0.80 |

Figure 18:
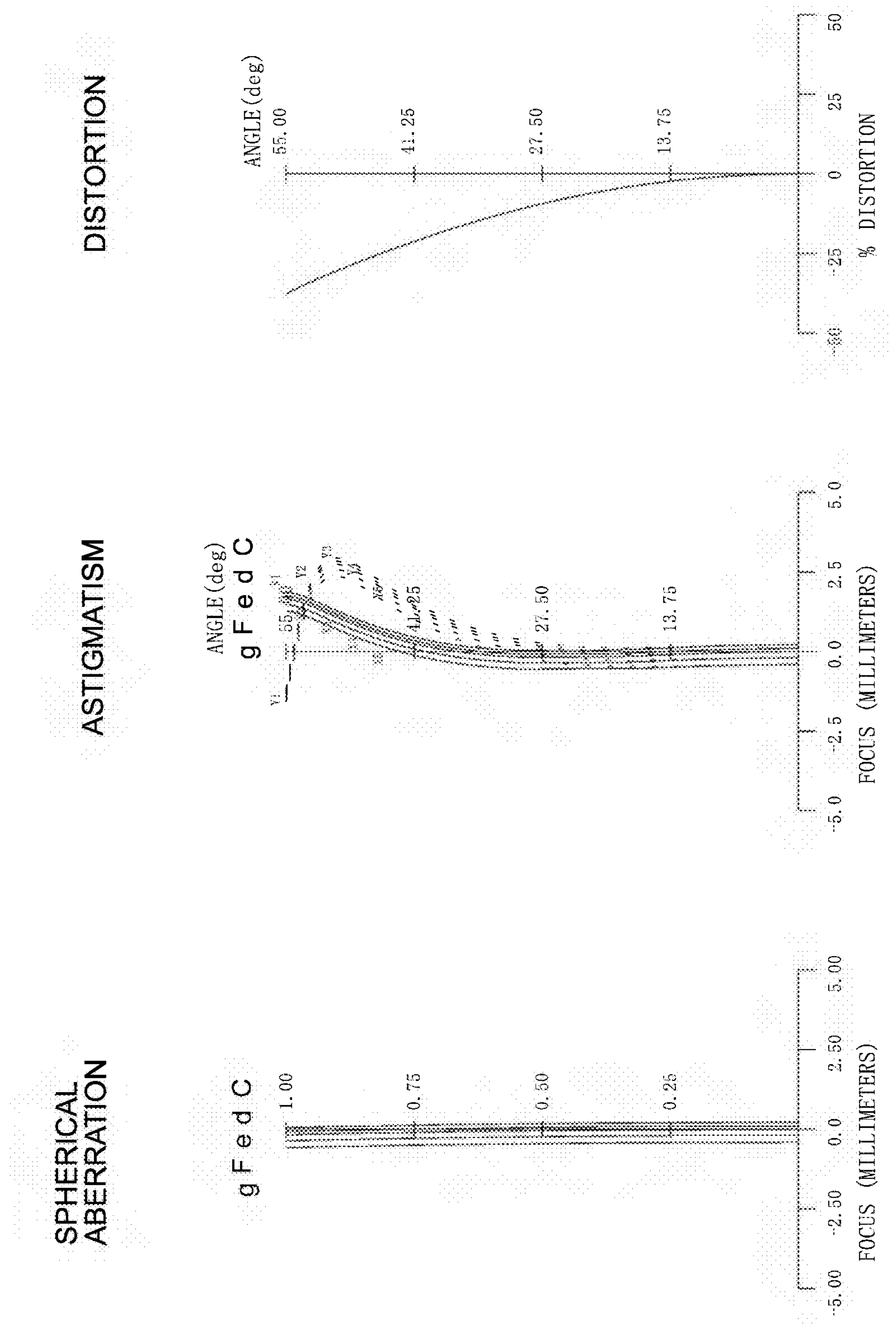
FIG. 18 is various aberration graphs of the ocular optical system according to the sixth example.
Figure 19:
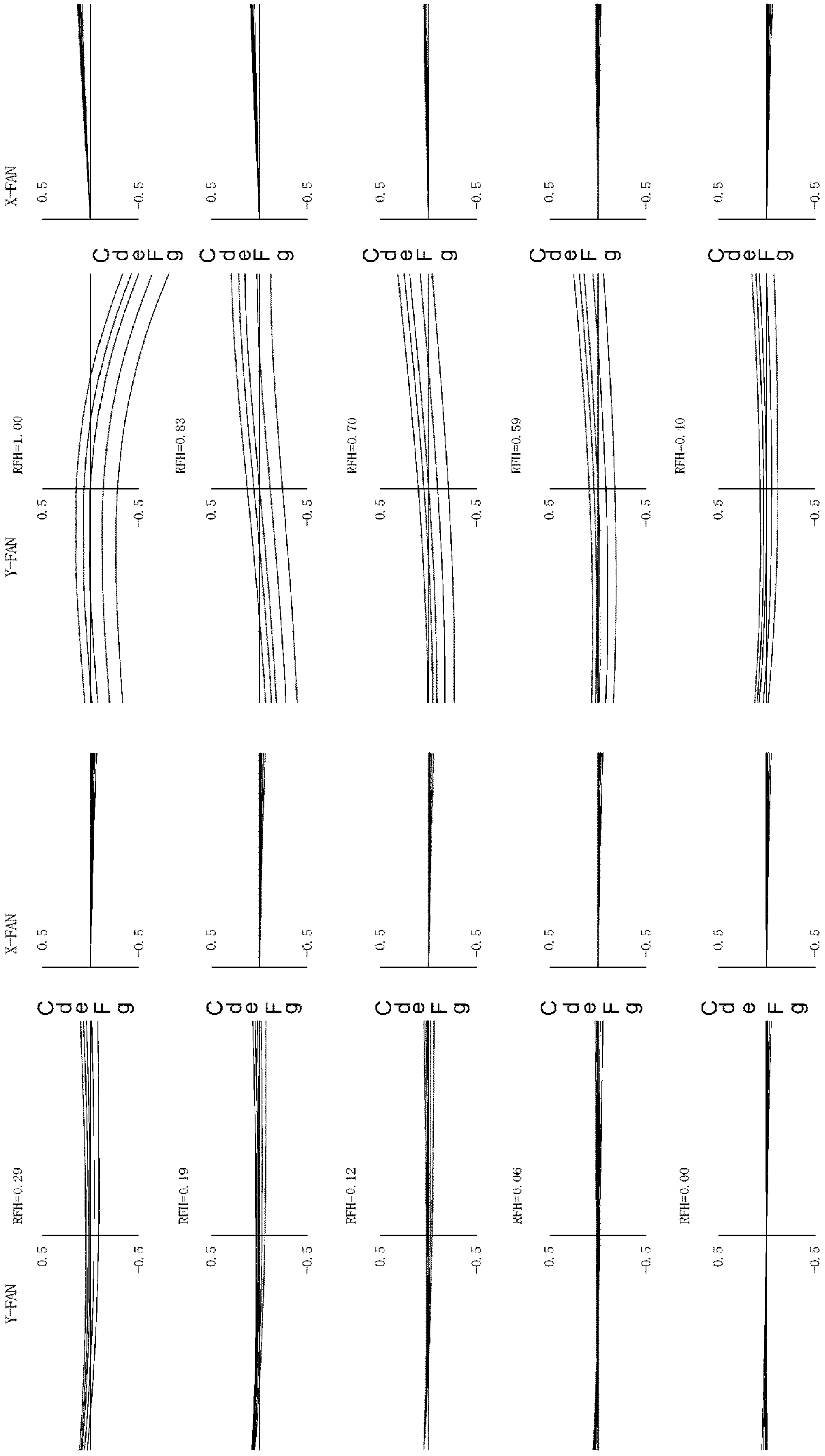
FIG. 19 is lateral aberration graphs of the ocular optical system according to the sixth example.

FIG. 18 is various aberration graphs of the ocular optical system according to the sixth example. FIG. 19 is lateral aberration graphs of the ocular optical system according to the sixth example. Each aberration graph demonstrates that in the sixth example, various aberrations are favorably corrected, and an excellent image forming performance is achieved.

As described above, each example can achieve the ocular optical system that has a large angle of view, and favorably corrected various aberrations, such as astigmatism, while achieving a low profile.

Note that the following details can be appropriately adopted in a range without degrading the optical performance of the optical system in this embodiment.

Two- and three-lens configurations are indicated as numerical examples of the ocular optical systems of this embodiment. However, the present application is not limited thereto. Alternatively, ocular optical systems having other configurations (for example, with four lenses or the like) can be configured. Specifically, a configuration may be adopted that includes a lens or a lens group added to the ocular optical system in this embodiment at a position closest to the object or closest to the image surface.

The lens surface may be formed as a spherical surface or a flat surface, or as an aspherical surface. In a case where the lens surface is a spherical surface or a flat surface, lens processing and assembly adjustment can be facilitated, which can prevent degradation in optical performance due to processing and assembly adjustment errors.

In a case where the lens surface is an aspherical surface, the aspherical surface may be any of an aspherical surface by a grinding process, a glass mold aspherical surface made by forming glass with a mold to have an aspherical shape, and a composite type aspherical surface made by forming resin to have an aspherical shape on a surface of glass. The lens surface may be a diffraction optical surface. The lens may be a gradient index lens (GRIN lens) or a plastic lens.

To reduce flares and ghosts and achieve a high-contrast optical performance, an antireflection film having a high transmissivity over a wide wavelength region may be applied onto each lens surface. Accordingly, flares and ghosts can be reduced, and a high optical performance with high contrast can be achieved.

EXPLANATION OF NUMERALS AND CHARACTERS

1 Head-mounted display
11 Image display (observation object)
EL Ocular optical system
L1 First lens
L2 Second lens
L3 Third lens
EP Eye point
FSa First Fresnel surface
FSb Second Fresnel surface

The invention claimed is:

1. An ocular optical system, comprising:

a first Fresnel lens that includes a first Fresnel surface formed on a lens surface facing an observation object; and a second Fresnel lens that is disposed closer to the observation object than the first Fresnel lens, and includes a second Fresnel surface formed on a lens surface facing the observation object, wherein at least in a range of a radius of 10 mm from an optical axis on each of the first Fresnel surface and the second Fresnel surface, at a plurality of wall surfaces constituting the first Fresnel surface and at a plurality of wall surfaces constituting the second Fresnel surface, inclined angles of the wall surfaces of the first Fresnel surface from the optical axis are larger than inclined angles of the respective wall surfaces on the second Fresnel surface in descending orders of proximity to the optical axis, wherein a following conditional expression is satisfied, $$0.3 \le fR1/fR2 \le 1.5$$

where fR1: a focal length of the first Fresnel lens, and fR2: a focal length of the second Fresnel lens, and wherein a lens surface of the first Fresnel lens facing an eye point is a smooth surface, and a lens surface of the second Fresnel lens facing the eye point is a smooth surface, and wherein each of the first Fresnel surface and the second Fresnel surface is formed to have ring bands having a saw-tooth shape in a sectional view, and pitches of Fresnel steps of each of the first Fresnel surface and the second Fresnel surface vary according to a position in a radial direction of the first Fresnel lens and the second Fresnel lens, respectively.

2. The ocular optical system according to claim 1, wherein at least in the range of the radius of 10 mm from the optical axis, the inclined angles of the wall surfaces of the first Fresnel surface from the optical axis are larger than the inclined angles of the wall surfaces of the second Fresnel surface from the optical axis.

3. The ocular optical system according to claim 1, wherein at least in the range of the radius of 10 mm from the optical axis on each of the first Fresnel surface and the second Fresnel surface, a following conditional expression is satisfied, $$2.5 \le \Phi1mx/\Phi2mx$$

where ϕ1mx: a maximum value of the inclined angles of the wall surfaces of the first Fresnel surface from the optical axis, and $\phi 2mx$: a maximum value of the inclined angles of the wall surfaces of the second Fresnel surface from the optical axis.

4. The ocular optical system according to claim 1, wherein at least in the range of the radius of 10 mm from the optical axis on each of the first Fresnel surface and the second Fresnel surface, a following conditional expression is satisfied, $$2.5 \leq \Phi 1av/\Phi 2av$$

where $\phi 1av$: an average value of the inclined angles of the wall surfaces of the first Fresnel surface from the optical axis, and $\phi 2av$: an average value of the inclined angles of the wall surfaces of the second Fresnel surface from the optical axis.

5. The ocular optical system according to claim 1, wherein a following conditional expression is satisfied, $$0 < AS1 \leq 1.4$$

where AS1: a maximum value of aspect ratios of the Fresnel steps of the first Fresnel surface.

6. The ocular optical system according to claim 1 wherein a following conditional expression is satisfied, $$0 < AS2 \leq 1.7$$

where AS2: a maximum value of aspect ratios of the Fresnel steps of the second Fresnel surface.

7. The ocular optical system according to claim 1, wherein a following conditional expression is satisfied, $$2.0[Deg./\text{mm}] \leq (2 \times \omega)/TL$$

where ω: an angle of view of the ocular optical system, and

TL: a total length of the ocular optical system.

8. The ocular optical system according to claim 1, wherein a following conditional expression is satisfied, $$0 < X1/TL \leq 0.80$$

where X1: a length from a lens surface of the first Fresnel lens facing an eye point to the observation object, and TL: a total length of the ocular optical system.

9. The ocular optical system according to claim 1, wherein a thickness of the first Fresnel lens on the optical axis is equal to or less than a thickness of the second Fresnel lens on the optical axis.

10. The ocular optical system according to claim 1, wherein a following conditional expression is satisfied, $$0 < 1 - (SG1/TH1) \leq 0.97$$

where SG1: an average value of amounts of sag of the first Fresnel surface, and

TH1: a thickness of the first Fresnel lens on the optical axis.

11. The ocular optical system according to claim 1, wherein a following conditional expression is satisfied, $$0 < 1 - (SG2/TH2) \leq 0.97$$

where SG2: an average value of amounts of sag of the second Fresnel surface, and TH2: a thickness of the second Fresnel lens on the optical axis.

12. The ocular optical system according to claim 1, wherein the first Fresnel lens and the second Fresnel lens have positive refractive powers.

13. The ocular optical system according to claim 1, wherein a lens surface of the first Fresnel lens facing an eye point is a flat surface, and a lens surface of the second Fresnel lens facing the eye point is a flat surface or an aspherical surface.

14. The ocular optical system according to claim 1, comprising:

the first Fresnel lens; the second Fresnel lens; and an aspherical lens having an aspherical surface, wherein the aspherical lens is disposed closer to the observation object than the second Fresnel lens, or between the first Fresnel lens and the second Fresnel lens.

15. A head-mounted display, comprising:

an image display capable of displaying an image; and an ocular optical system for observing the image displayed on the image display, wherein the ocular optical system is the ocular optical system according to claim 1.

16. An ocular optical system, comprising:

a first Fresnel lens that includes a first Fresnel surface formed on a lens surface facing an observation object; and a second Fresnel lens that is disposed closer to the observation object than the first Fresnel lens, and includes a second Fresnel surface formed on a lens surface facing the observation object, wherein at least in a range of a radius of 10 mm from an optical axis on each of the first Fresnel surface and the second Fresnel surface, and at a plurality of wall surfaces constituting the first Fresnel surface and at a plurality of wall surfaces constituting the second Fresnel surface, wherein a following conditional expression is satisfied, $$2.5 \leqq \Phi 1mx/\Phi 2mx$$

where $\phi 1mx$: The maximum inclined angle of the wall surface of the first Fresnel surface form the optical axis, and $\phi 2mx$: The maximum inclined angle of the wall surface of the second Fresnel surface form the optical axis; and inclined angles of the wall surfaces of the first Fresnel surface from the optical axis are larger than inclined angles of the respective wall surfaces on the second Fresnel surface in descending orders of proximity to the optical axis, wherein a following conditional expression is satisfied, $$0.3 \le fR1/fR2 \le 1.5$$

where fR1: a focal length of the first Fresnel lens, and fR2: a focal length of the second Fresnel lens, and wherein a lens surface of the first Fresnel lens facing an eye point is a smooth surface, and a lens surface of the second Fresnel lens facing the eye point is a smooth surface, and wherein each of the first Fresnel surface and the second Fresnel surface is formed to have ring bands having a saw-tooth shape in a sectional view, and pitches of Fresnel steps of each of the first Fresnel surface and the second Fresnel surface vary according to a position in a radial direction of the first Fresnel lens and the second Fresnel lens, respectively.

17. An ocular optical system, comprising:

a first Fresnel lens that includes a first Fresnel surface formed on a lens surface facing an observation object; and a second Fresnel lens that is disposed closer to the observation object than the first Fresnel lens, and includes a second Fresnel surface formed on a lens surface facing the observation object, wherein at least in a range of a radius of 10 mm from an optical axis on each of the first Fresnel surface and the second Fresnel surface, and at a plurality of wall surfaces constituting the first Fresnel surface and at a plurality of wall surfaces constituting the second Fresnel surface, wherein a following conditional expression is satisfied, $$2.5 \leqq \Phi 1av/\Phi 2av$$

where $\phi$1av: The average inclined angle of the wall surface of the first Fresnel surface form the optical axis, and $\phi$2av: The average inclined angle of the wall surface of the second Fresnel surface form the optical axis; and inclined angles of the wall surfaces of the first Fresnel surface from the optical axis are larger than inclined angles of the respective wall surfaces on the second Fresnel surface in descending orders of proximity to the optical axis, wherein a following conditional expression is satisfied, $$0.3 \le fR1/fR2 \le 1.5$$

where fR1: a focal length of the first Fresnel lens, and fR2: a focal length of the second Fresnel lens, and wherein a lens surface of the first Fresnel lens facing an eye point is a smooth surface, and a lens surface of the second Fresnel lens facing the eye point is a smooth surface, and wherein each of the first Fresnel surface and the second Fresnel surface is formed to have ring bands having a saw-tooth shape in a sectional view, and pitches of Fresnel steps of each of the first Fresnel surface and the second Fresnel surface vary according to a position in a radial direction of the first Fresnel lens and the second Fresnel lens, respectively.

18. A method for manufacturing an ocular optical system, comprising:

disposing a first Fresnel lens that includes a first Fresnel surface formed on a lens surface facing an observation object, and a second Fresnel lens that is disposed closer to the observation object than the first Fresnel lens, and includes a second Fresnel surface formed on a lens surface facing the observation object, and arranging at least in a range of a radius of 10 mm from an optical axis on each of the first Fresnel surface and the second Fresnel surface, at a plurality of wall surfaces constituting the first Fresnel surface and at a plurality of wall surfaces constituting the second Fresnel surface, inclined angles of the wall surfaces of the first Fresnel surface from the optical axis are larger than inclined angles of the respective wall surfaces on the second Fresnel surface in descending orders of proximity to the optical axis, wherein a following conditional expression is satisfied, $$0.3 \le fR1/fR2 \le 1.5$$

where fR1: a focal length of the first Fresnel lens, and fR2: a focal length of the second Fresnel lens, and wherein a lens surface of the first Fresnel lens facing an eye point is a smooth surface, and a lens surface of the second Fresnel lens facing the eye point is a smooth surface, and wherein each of the first Fresnel surface and the second Fresnel surface is formed to have ring bands having a saw-tooth shape in a sectional view, and pitches of Fresnel steps of each of the first Fresnel surface and the second Fresnel surface vary according to a position in a radial direction of the first Fresnel lens and the second Fresnel lens, respectively.

* * * * *